US012707201B2

(12) United States Patent
Hiraki et al.

(10) Patent No.: US 12,707,201 B2
(45) Date of Patent: Aug. 11, 2026

(54) SOUNDBAR DEVICE AND METHOD FOR SETTING SOUNDBAR DEVICE

(71) Applicant: D&M Holdings Inc., Kanagawa (JP)

(72) Inventors: Shinichiro Hiraki, Kanagawa (JP); Toshiki Kunimoto, Kanagawa (JP)

(73) Assignee: D&M HOLDINGS INC., Kanagawa (JP)

( * ) Notice: Subject to any disclaimer, the term of this patent is extended or adjusted under 35 U.S.C. 154(b) by 134 days.

(21) Appl. No.: 18/851,474

(22) PCT Filed: Oct. 11, 2022

(86) PCT No.: PCT/JP2022/037784
§ 371 (c)(1),
(2) Date: Sep. 26, 2024

(87) PCT Pub. No.: WO2023/188474
PCT Pub. Date: Oct. 5, 2023

(65) Prior Publication Data

US 2025/0211903 A1 Jun. 26, 2025

(30) Foreign Application Priority Data

Mar. 28, 2022 (JP) ................................ 2022-052647

(51) Int. Cl.
*H04R 3/12* (2006.01)
*H04R 1/02* (2006.01)
(Continued)

(52) U.S. Cl.
CPC ............... *H04R 3/12* (2013.01); *H04R 1/025* (2013.01); *H04R 5/02* (2013.01); *H04S 3/008* (2013.01); *H04S 2400/01* (2013.01)

(58) Field of Classification Search
CPC .. H04R 1/025; H04R 3/12; H04R 5/02; H04S 3/008; H04S 2400/01
See application file for complete search history.

(56) References Cited

U.S. PATENT DOCUMENTS 9,294,840 B1 * 3/2016 Anderson ................ H04R 5/00
9,866,965 B2 * 1/2018 Friedlander .............. H04R 5/04
(Continued)

FOREIGN PATENT DOCUMENTS

CN 208874662 U 5/2019
JP 2009055450 A 3/2009

*Primary Examiner* — Paul W Huber
(74) *Attorney, Agent, or Firm* — Nieves IP Law Group, LLC; Peter A. Nieves

(57) ABSTRACT

[Problem] To provide a soundbar device with which it is possible to realize an optimum surround environment that corresponds to the screen width of a television device. [Solution] This soundbar device 1 comprises: a first housing 10 having a speaker at a front surface and a left side surface; and a second housing 11 having a speaker at a front surface and a right side surface, it being possible to attach/detach the second housing 11 to/from the right side of the first housing 10 using an attachment/detachment mechanism 12. One of the first housing 10 and the second housing 11 is a main housing, and the other of the two housings is a sub-housing. The main housing extracts an audio signal for a channel allocated to the speakers provided to the main housing from a multi-channel audio signal received by a television device 3, plays back the extracted audio signal, and outputs the played-back audio signal from the speakers, and also extracts an audio signal for a channel allocated to the speakers provided to the sub-housing and transmits the extracted audio signal to the sub-housing. The sub-housing receives the audio signal from the main housing, plays back the received audio signal, and outputs the played-back audio signal from the speakers provided to the sub-housing.

8 Claims, 13 Drawing Sheets

(51) Int. Cl.
*H04R 5/02* (2006.01)
*H04S 3/00* (2006.01)

(56) References Cited

U.S. PATENT DOCUMENTS

| | | | | |
|---|---|---|---|---|
| 10,111,003 | B2 * | 10/2018 | Ang | H04R 5/04 |
| 11,317,208 | B2 * | 4/2022 | Chau | H04R 1/02 |
| 2015/0287419 | A1 * | 10/2015 | Chen | H04R 3/12 |
| | | | | 704/500 |
| 2017/0223457 | A1 * | 8/2017 | Park | H04S 7/308 |
| 2020/0053462 | A1 * | 2/2020 | Qian | H04R 1/026 |
| 2020/0128328 | A1 * | 4/2020 | Liniado | H04S 3/008 |

* cited by examiner

SOUNDBAR DEVICE AND METHOD FOR SETTING SOUNDBAR DEVICE

CROSS-REFERENCE TO RELATED APPLICATIONS

This application is the National Stage Application of and claims the benefit of International Application No. PCT/JP2022/037784, filed Oct. 11, 2022, entitled SOUNDBAR DEVICE AND METHOD FOR SETTING UP SOUNDBAR DEVICE which claims the benefit of Japanese Patent Application Serial No. JP2022-052647A, filed Mar. 28, 2022, both of which are incorporated by reference herein in their entirety.

TECHNICAL FIELD

The present invention relates to a sound bar device.

BACKGROUND ART

In recent years, home theater systems in which a sound bar device is combined with a television device have become widespread. A sound bar device is a speaker system configured such that speakers of a plurality of channels are arranged in the same housing. Compared to installing a speaker for each channel individually, installation space efficiency is better and the installation work is easier. Therefore, through use of a sound bar device, a surround sound audio reproduction environment can be easily achieved even in an ordinary home with limited space (for example, Patent Literature 1).

CITATION LIST

Patent Literature

[PTL 1] JP 2009-55450 A

SUMMARY OF INVENTION

Technical Problem

In general, in the sound bar device, a speaker of each channel is accommodated in a housing with a predetermined layout so that an optimum surround sound environment can be achieved when the sound bar device is installed below the television device. However, in recent years, in a television device using a liquid crystal display (LCD), an organic electro luminescence (EL) display, or the like, a screen has been increased in size. When the width of the sound bar device is narrow as compared with such a television device having a large-size screen, the spread of the surround sound becomes insufficient as compared with the size of the video displayed on the screen, and thus an optimum surround sound environment cannot be achieved. Meanwhile, replacing of the sound bar device every time the television device is replaced with a television device having a large-size screen to adapt to the screen width of the television device causes a great increase in cost.

The present invention has been made in view of the above-mentioned circumstances, and has an object to provide a sound bar device capable of achieving an optimum surround sound environment corresponding to a screen width of a television device.

Solution to Problem

In order to solve the above-mentioned problems, a sound bar device of the present invention includes: a first housing including, in a front surface thereof, a speaker to which a left channel is assigned, and, in a left side surface thereof, a speaker to which a left surround channel is assigned; and a second housing including, in a front surface thereof, a speaker to which a right channel is assigned, and, in a right side surface thereof, a speaker to which a right surround channel is assigned, the second housing being removable from and mountable on a right side of the first housing, and one of the first housing and the second housing is a main housing, and another one thereof is a sub-housing. The main housing receives a multi-channel audio signal transmitted from an external device (audio-visual device such as a television device), and extracts and reproduces an audio signal of the channel assigned to the speaker included in the main housing from this multi-channel audio signal, and outputs the reproduced audio signal from the speaker. In addition, the main housing extracts an audio signal of the channel assigned to the speaker included in the sub-housing to transmit the audio signal to this sub-housing. Meanwhile, the sub-housing receives the audio signal from the main housing to reproduce the audio signal, and outputs the reproduced audio signal from the speaker included in the sub-housing.

For example, according to one embodiment of the present invention, there is provided a sound bar device including a plurality of speakers, the sound bar device further including: a first housing including, in a front surface thereof, a corresponding one of the plurality of speakers to which a left channel is assigned, and, in a left side surface thereof, a corresponding one of the plurality of speakers to which a left surround channel is assigned; and a second housing including, in a front surface thereof, a corresponding one of the plurality of speakers to which a right channel is assigned, and, in a right side surface thereof, a corresponding one of the plurality of speakers to which a right surround channel is assigned, the second housing being removable from and mountable on a right side of the first housing, wherein one of the first housing and the second housing is a main housing, and another one thereof is a sub-housing, wherein the main housing includes: external device connection means for connecting to an external device configured to transmit a multi-channel audio signal; main reproduction means for extracting and reproducing, from the multi-channel audio signal received from the external device, an audio signal of a channel assigned to the corresponding one of the plurality of speakers included in the main housing, and outputting the reproduced audio signal from the corresponding one of the plurality of speakers; and audio signal transmission means for extracting, from the multi-channel audio signal received from the external device, an audio signal of a channel assigned to the corresponding one of the plurality of speakers included in the sub-housing, and transmitting the extracted audio signal to the sub-housing, and wherein the sub-housing includes: audio signal reception means for receiving the audio signal from the main housing; and sub-reproduction means for reproducing the audio signal received by the audio signal reception means, and outputting the reproduced audio signal from the corresponding one of the plurality of speakers included in the sub-housing.

Advantageous Effects of Invention

According to the present invention, the second housing including the speaker to which the right channel is assigned and the speaker to which the right surround channel is assigned is mountable on and removable from the first housing including the speaker to which the left channel is assigned and the speaker to which the left surround channel is assigned. Thus, when the width of the sound bar device is narrow as compared with the screen width of the external device (television device or the like), the first housing and the second housing are separated from each other, and those housings are arranged in accordance with the screen width of the television device. Thus, an optimum surround sound environment corresponding to the screen width of the television device can be achieved.

DESCRIPTION OF EMBODIMENTS

An embodiment of the present invention is described below.

First Embodiment

Figure 1:
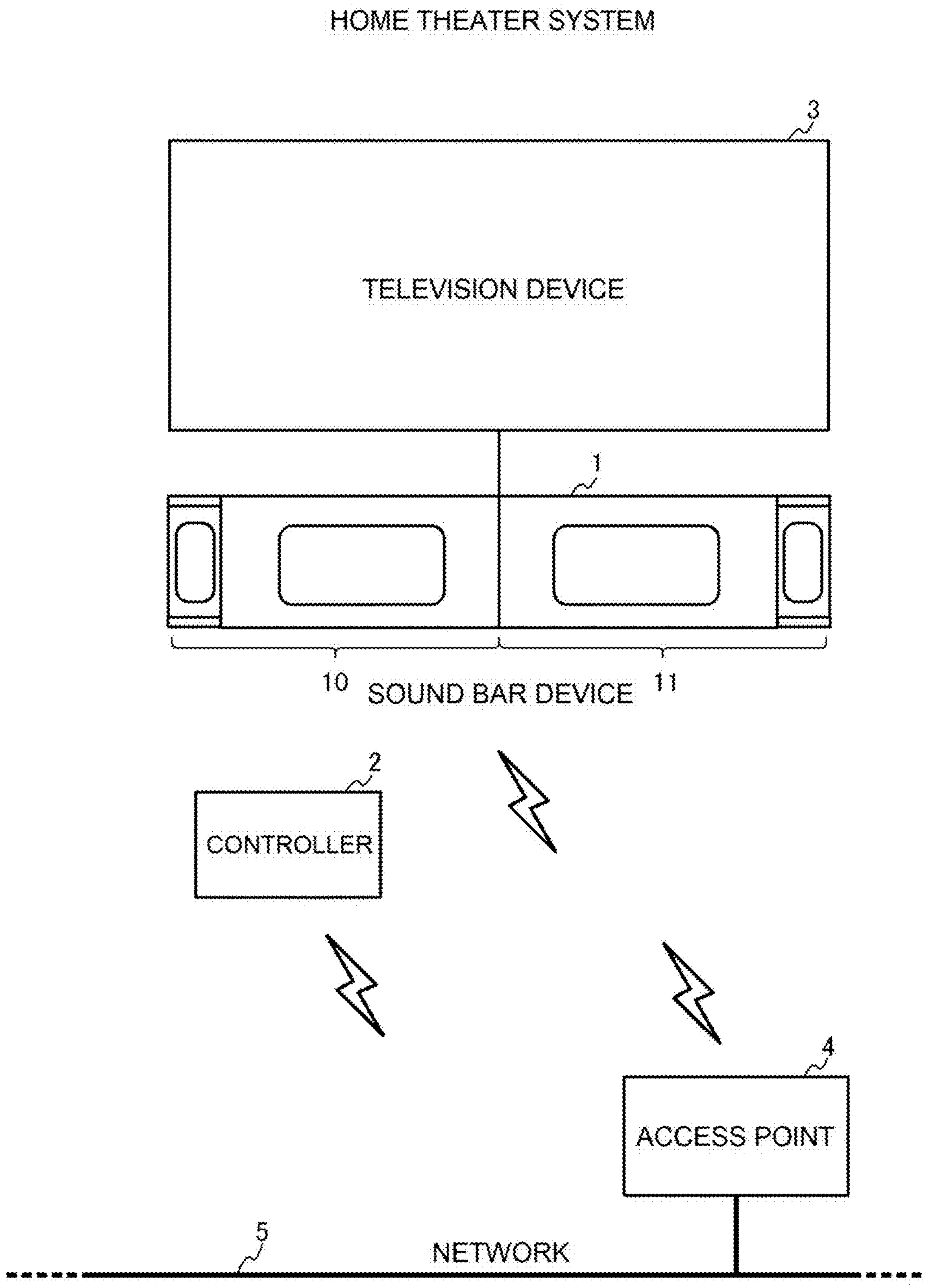
FIG. 1 is a schematic configuration diagram of a home theater system including a sound bar device (1) according to a first embodiment of the present invention.

FIG. 1 is a schematic configuration diagram of a home theater system including a sound bar device 1 according to a first embodiment of the present invention.

As illustrated in the figure, the home theater system in this embodiment includes the sound bar device 1, a controller 2 for remotely controlling the sound bar device 1, and a television device 3 using an LCD, an organic EL display, or the like.

The sound bar device 1 and the television device 3 are connected to each other by a communication interface such as high-definition multimedia interface (HDMI (trademark)). Further, the sound bar device 1 and the controller 2 are connected to each other via an access point 4 connected to a network 5 such as a wide area network (WAN) or a local area network (LAN).

FIG. 2(A) to FIG. 2(D) are a schematic front view, a schematic top view, a schematic left side view, and a schematic right side view of the sound bar device 1, respectively.

As illustrated in the figures, the sound bar device 1 includes a first housing 10 which is a main housing, and a second housing 11 which is a sub-housing.

The first housing 10 and the second housing 11 are provided with a mounting/removing mechanism 12 for removably mounting the second housing 11 on the right side of the first housing 10 (removably mounting the first housing 10 on the left side of the second housing 11). For example, this mounting/removing mechanism 12 may be achieved by a mechanical structure, such as installing a protruding portion in one of a right side surface of the first housing 10 and a left side surface of the second housing 11 and installing a recessed portion to be fitted to this protruding portion in another one thereof, or may use a magnetic force, such as installing a magnet on one of the right side surface of the first housing 10 and the left side surface of the second housing 11 and installing a metal plate to be attracted to this magnet on another one thereof.

In the first housing 10, a left channel speaker 100-1 and a left surround channel speaker 100-2 are arranged in a front surface and a left side surface thereof, respectively. In the second housing 11, a right channel speaker 110-1 and a right surround channel speaker 110-2 are arranged in a front surface and a right side surface thereof, respectively.

The left surround channel speaker 100-2 is installed in the left side surface of the first housing 10 so as to emit the sound to the front left. In order to prevent the left surround channel speaker 100-2 from coming into contact with an installation surface when the first housing 10 is vertically placed with the left side surface being directed downward, the first housing 10 includes a leg portion 109. Further, the right surround channel speaker 110-2 is installed in the right side surface of the second housing 11 so as to emit the sound to the front right. In order to prevent the right surround channel speaker 110-2 from coming into contact with an installation surface when the second housing 11 is vertically placed with the right side surface being directed downward, the second housing 11 includes a leg portion 119.

Figure 3:
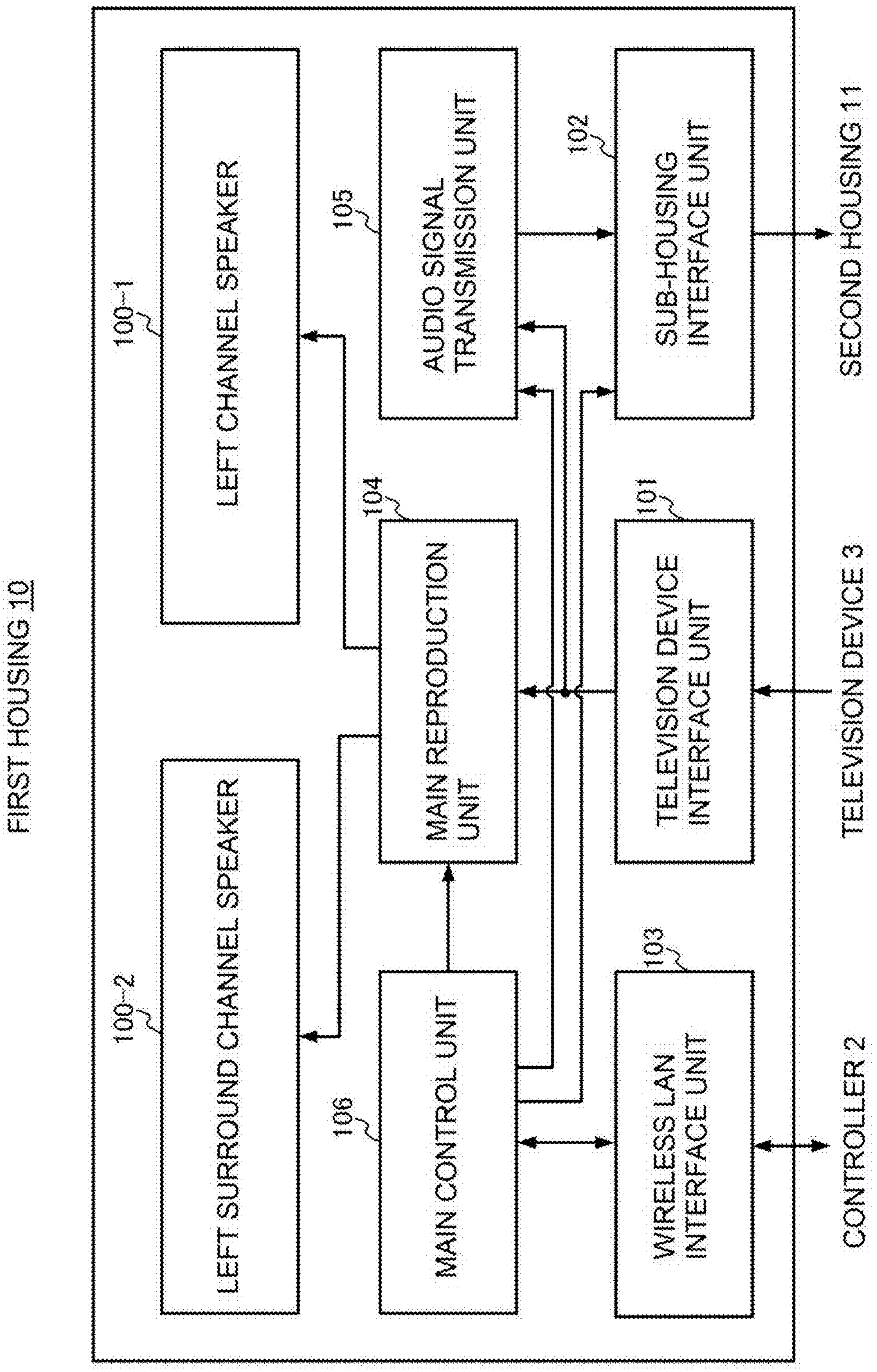
FIG. 3 is a schematic functional configuration diagram of a first housing (10) which is a main housing.

FIG. 3 is a schematic functional configuration diagram of the first housing 10 which is the main housing.

As illustrated in the figure, the first housing 10 which is the main housing further includes, in addition to the left channel speaker 100-1 and the left surround channel speaker 100-2 described above, a television device interface unit 101, a sub-housing interface unit 102, a wireless LAN interface unit 103, a main reproduction unit 104, an audio signal transmission unit 105, and a main control unit 106.

The television device interface unit 101 is a communication interface for connecting to the television device 3 by HDMI (trademark).

The sub-housing interface unit 102 is a communication interface for connecting to the second housing 11 which is the sub-housing by short-range wireless communication such as Bluetooth (trademark).

The wireless LAN interface unit 103 is a communication interface for connecting to the access point 4 through use of the wireless LAN connection.

The main reproduction unit 104 extracts and reproduces, from a multi-channel audio signal received from the television device 3 via the television device interface unit 101, an audio signal of a channel assigned to the speaker included in the main housing, and outputs the reproduced audio signal from the speaker.

In this embodiment, when a reproduction mode is a default reproduction mode to be described later, audio signals of the left channel and the left surround channel are extracted and reproduced from a multi-channel audio signal, and the reproduced audio signals are output from the left channel speaker 100-1 and the left surround channel speaker 100-2, respectively. Further, when a reproduction mode is a first channel change reproduction mode to be described later, audio signals of the left channel and a left height channel are extracted and reproduced from a multi-channel audio signal, and the reproduced audio signals are output from the left channel speaker 100-1 and the left surround channel speaker 100-2, respectively. In addition, when a reproduction mode is a second channel change reproduction mode to be described later, audio signals of the left channel and a subwoofer channel are extracted and reproduced from a multi-channel audio signal, and the reproduced audio signals are output from the left channel speaker 100-1 and the left surround channel speaker 100-2, respectively.

The audio signal transmission unit 105 extracts, from the multi-channel audio signal received from the television device 3 via the television device interface unit 101, an audio signal of a channel assigned to the speaker included in the sub-housing, and transmits the audio signal to the sub-housing from the sub-housing interface unit 102.

In this embodiment, when the reproduction mode is the default reproduction mode, audio signals of the right channel and the right surround channel are extracted from the multi-channel audio signal, and a multi-channel audio signal including those audio signals is transmitted to the second housing 11. In addition, when the reproduction mode is the first channel change reproduction mode, audio signals of the right channel and a right height channel are extracted from the multi-channel audio signal, and a multi-channel audio signal including those audio signals is transmitted to the second housing 11. Further, when the reproduction mode is the second channel change reproduction mode, audio signals of the right channel and the subwoofer channel are extracted from the multi-channel audio signal, and a multi-channel audio signal including those audio signals is transmitted to the second housing 11.

The main control unit 106 controls each of the speakers and units 100-1, 100-2, and 102 to 105 of the first housing 10 which is the main housing in an integrated manner.

Further, when the main control unit 106 receives a channel change instruction accompanying a designation of the reproduction mode from the controller 2 via the wireless LAN interface unit 103, the main control unit 106 transmits a channel change notification accompanying a designation of the designated reproduction mode to the second housing 11 which is the sub-housing, and changes the channels assigned to the speakers included in the first housing 10 which is the main housing and the second housing 11 which is the sub-housing in accordance with the designated reproduction mode.

Specifically, in the case e of the default reproduction mode in which each of the first housing 10 and the second housing 11 is horizontally placed with the lower surface thereof being directed downward (see FIG. 1 and FIG. 6), the left channel, the left surround channel, the right channel, and the right surround channel are assigned to the left channel speaker 100-1, the left surround channel speaker 100-2, the right channel speaker 110-1, and the right surround channel speaker 110-2, respectively. Further, in the case of the first channel change reproduction mode in which the first housing 10 is vertically placed with the left side surface thereof being directed upward and the second housing 11 is vertically placed with the right side surface thereof being directed upward (see FIG. 7), the left channel, the left height channel, the right channel, and the right height channel are assigned to the left channel speaker 100-1, the left surround channel speaker 100-2, the right channel speaker 110-1, and the right surround channel speaker 110-2, respectively. In addition, in the case of the second channel change reproduction mode in which the first housing 10 is vertically placed with the left side surface thereof being directed downward and the second housing 11 is vertically placed with the right side surface thereof being directed downward (see FIG. 8), the left channel, the subwoofer channel, the right channel, and the subwoofer channel are assigned to the left channel speaker 100-1, the left surround channel speaker 100-2, the right channel speaker 110-1, and the right surround channel speaker 110-2, respectively.

In an initial state of the sound bar device 1 (when the sound bar device 1 is powered on), the reproduction mode is set to the default reproduction mode, and the main control unit 106 assigns the left channel, the left surround channel, the right channel, and the right surround channel to the left channel speaker 100-1, the left surround channel speaker 100-2, the right channel speaker 110-1, and the right surround channel speaker 110-2, respectively.

The function configuration of the first housing 10 which is a main housing illustrated in FIG. 3 may be implemented in the form of hardware by an integrated logic IC such as an application-specific integrated circuit (ASIC) or a field-programmable gate array (FPGA), or may be implemented in the form of software by a computer such as a digital signal processor (DSP).

Figure 4:
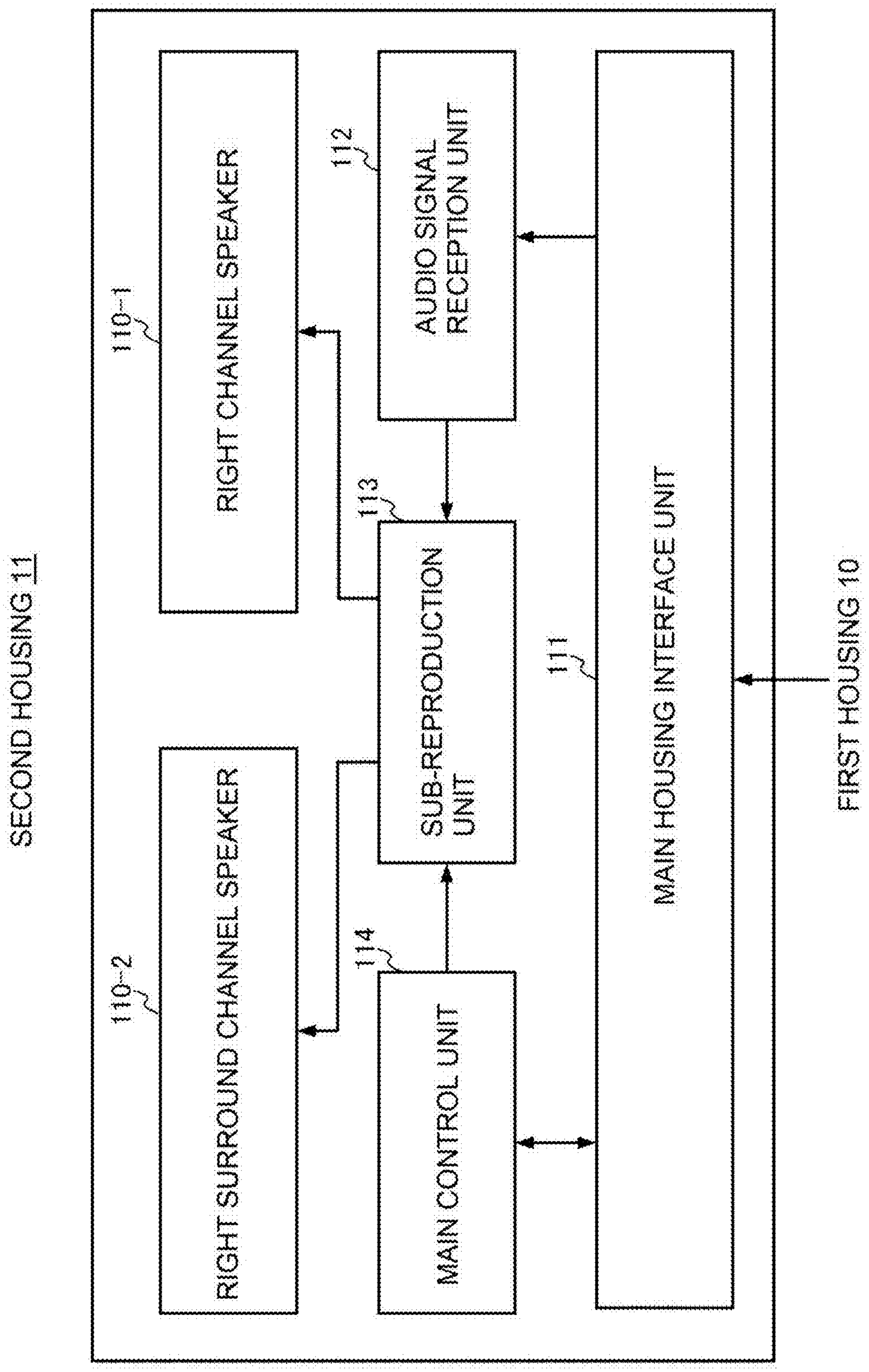
FIG. 4 is a schematic functional configuration diagram of a second housing (11) which is a sub-housing.

FIG. 4 is a schematic functional configuration diagram of the second housing 11 which is the sub-housing.

As illustrated in the figure, the second housing 11 which is the sub-housing further includes, in addition to the right channel speaker 110-1 and the right surround channel speaker 110-2 described above, a main housing interface unit 111, an audio signal reception unit 112, a sub-reproduction unit 113, and a main control unit 114.

The main housing interface unit 111 is a communication interface for connecting to the first housing 10 which is the main housing by short-range wireless communication such as Bluetooth (trademark).

The audio signal reception unit 112 receives, from the first housing 10 which is the main housing via the main housing interface unit 111, a multi-channel audio signal including audio signals of the channels assigned to the speakers 110-1 and 110-2 arranged in the second housing 11.

The sub-reproduction unit 113 reproduces, for each channel, the multi-channel audio signal received from the first housing 10 which is the main housing by the audio signal reception unit 112, and outputs the reproduced audio signal of each channel from a corresponding one of the speakers 110-1 and 110-2.

Specifically, in the default reproduction mode, the multi-channel audio signal received from the first housing 10 is reproduced into audio signals of the right channel and the right surround channel, and the reproduced right channel audio signal and the reproduced right surround channel audio signal are output from the right channel speaker 110-1 and the right surround channel speaker 110-2, respectively. In addition, in the first channel change reproduction mode, the multi-channel audio signal received from the first housing 10 is reproduced into audio signals of the right channel and the right height channel, and the reproduced right channel audio signal and the reproduced right height channel audio signal are output from the right channel speaker 110-1 and the right surround channel speaker 110-2, respectively. In addition, in the second channel change reproduction mode, the multi-channel audio signal received from the first housing 10 is reproduced into audio signals of the right channel and the subwoofer channel, and the reproduced right channel audio signal and the reproduced subwoofer channel audio signal are output from the right channel speaker 110-1 and the right surround channel speaker 110-2, respectively.

The main control u unit 114 controls each of the speakers and units 110-1, 110-2, and 111 to 113 of the second housing 11 which is the sub-housing in an integrated manner.

Further, when the main control unit 114 receives the channel change notification from the first housing 10 which is the main housing via the main housing interface unit 111, the main control unit 114 changes the channels assigned to the right channel speaker 110-1 and the right surround channel speaker 110-2 in accordance with the reproduction mode designated by this channel change notification.

Specifically, in the default reproduction mode, the right channel and the right surround channel are assigned to the right channel speaker 110-1 and the right surround channel speaker 110-2, respectively. In addition, in the first channel change reproduction mode, the right channel and the right height channel are assigned to the right channel speaker 110-1 and the right surround channel speaker 110-2, respectively. In addition, in the second channel change reproduction mode, the right channel and the subwoofer channel are assigned to the right channel speaker 110-1 and the right surround channel speaker 110-2, respectively.

As described above, in the initial state of the sound bar device 1 (when the sound bar device 1 is powered on), the reproduction mode is set to the default reproduction mode, and the main control unit 114 assigns the right channel and the right surround channel to the right channel speaker 110-1 and the right surround channel speaker 110-2, respectively.

Similarly to the function configuration of the first housing 10 which is the main housing illustrated in FIG. 3, the function configuration of the second housing 11 which is the sub-housing illustrated in FIG. 4 may also be implemented in the form of hardware by an integrated logic IC such as an ASIC or an FPGA, or may be implemented in the form of software by a computer such as a DSP.

Figure 5:
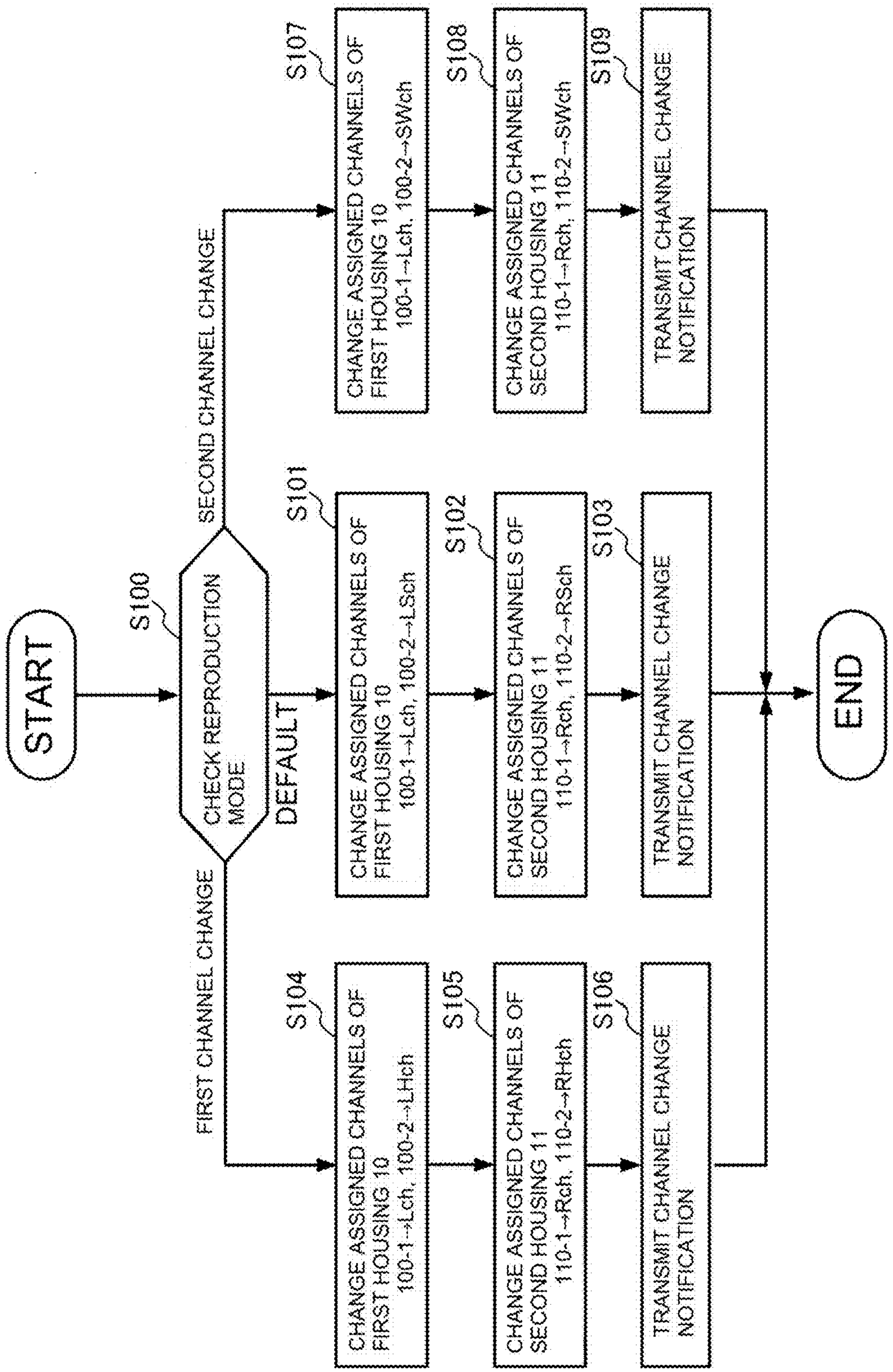
FIG. 5 is an explanatory flow chart for illustrating operation mode setting processing of the sound bar device (1).

FIG. 5 is an explanatory flow chart for illustrating operation mode setting processing of the sound bar device 1.

This flow is started when, in the first housing 10 which is the main housing, the wireless LAN interface unit 103 receives the channel change instruction accompanying the designation of the reproduction mode from the controller 2.

First, the main control unit 106 checks the reproduction mode designated by the channel change instruction (Step S100). Then, when the designated reproduction mode is the default reproduction mode ("DEFAULT" in Step S100), the main control unit 106 changes the channels assigned to the left channel speaker 100-1 and the left surround channel speaker 100-2 accommodated in the first housing 10 to the left channel (Lch) and the left surround channel (LSch), respectively (Step S101). Further, the main control unit 106 changes the channels assigned to the right channel speaker 110-1 and the right surround channel speaker 110-2 accommodated in the second housing 11 to the right channel (Rch) and the right surround channel (RSch), respectively (Step S102). Then, the main control unit 106 transmits the channel change notification accompanying the designation of the default reproduction mode to the second housing 11 which is the sub-housing via the sub-housing interface unit 102 (Step S103).

Further, when the designated reproduction mode is the first channel change reproduction mode ("FIRST CHANNEL CHANGE" in Step S100), the main control unit 106 changes the channels assigned to the left channel speaker 100-1 and the left surround channel speaker 100-2 accommodated in the first housing 10 to the left channel and the left height channel (LHch), respectively (Step S104). Further, the main control unit 106 changes the channels assigned to the right channel speaker 110-1 and the right surround channel speaker 110-2 accommodated in the second housing 11 to the right channel and the right height channel (RHch), respectively (Step S105). Then, the main control unit 106 transmits the channel change notification accompanying the designation of the first channel reproduction mode to the second housing 11 which is the sub-housing via the sub-housing interface unit 102 (Step S106).

Further, when the designated reproduction mode is the second channel change reproduction mode ("SECOND CHANNEL CHANGE" in Step S100), the main control unit 106 changes the channels assigned to the left channel speaker 100-1 and the left surround channel speaker 100-2 accommodated in the first housing 10 to the left channel and the subwoofer channel (SWch), respectively (Step S107). Further, the main control unit 106 changes the channels assigned to the right channel speaker 110-1 and the right surround channel speaker 110-2 accommodated in the second housing 11 to the right channel and the subwoofer channel, respectively (Step S108). Then, the main control unit 106 transmits the channel change notification accompanying the designation of the second channel reproduction mode to the second housing 11 which is the sub-housing via the sub-housing interface unit 102 (Step S109).

Figure 6:
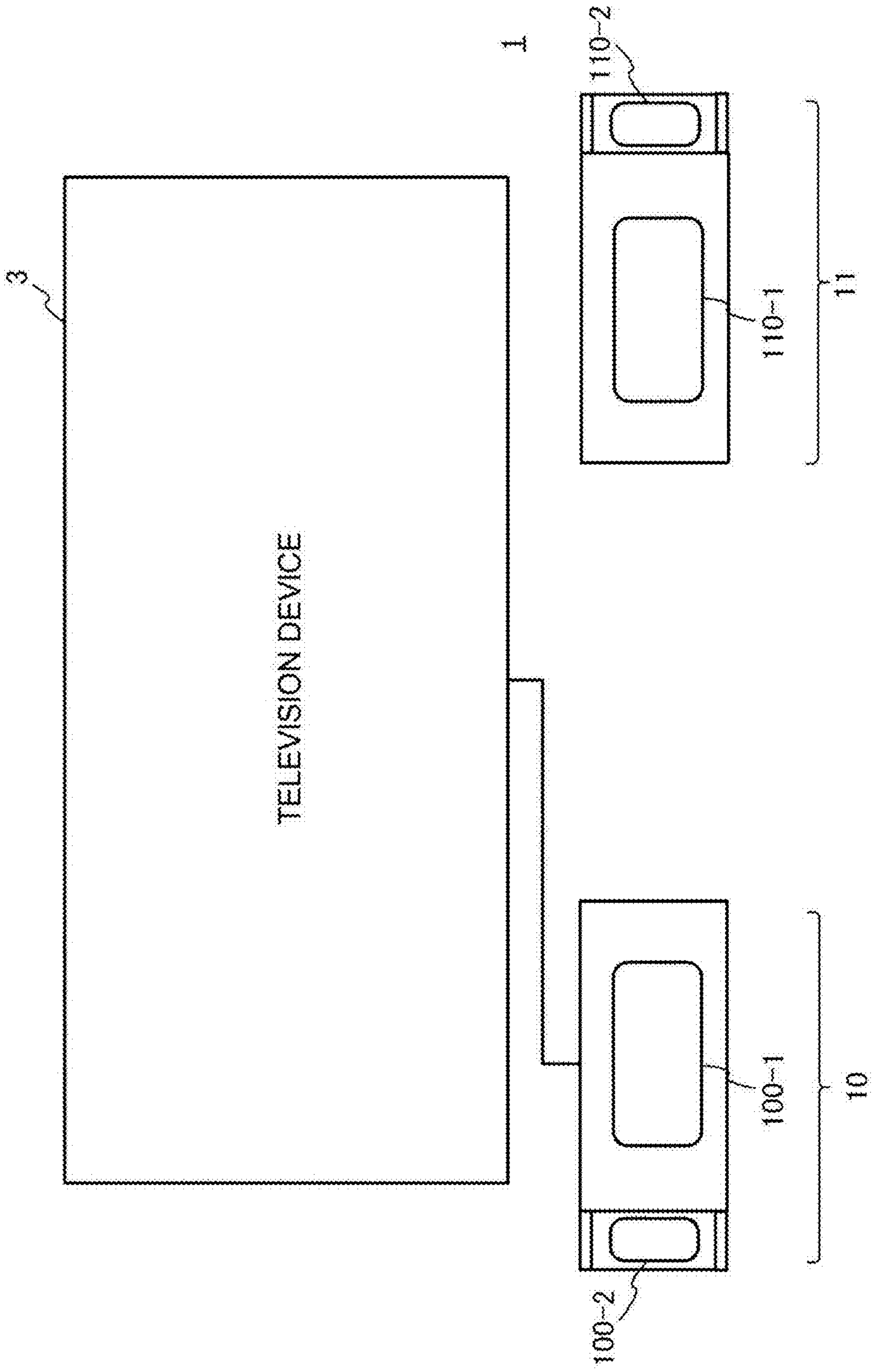
FIG. 6 is an explanatory view for illustrating an installation example of the sound bar device (1) in a default reproduction mode.

FIG. 6 is an explanatory view for illustrating an installation example of the sound bar device 1 in the default reproduction mode.

In the home theater system in this embodiment illustrated in FIG. 1, in a case in which, for example, the television device 3 is replaced with a television device having a larger size and thus the width of the sound bar device 1 has become smaller than the screen width of the television device 3, as illustrated in FIG. 6, the first housing 10 and the second housing 11 are separated from each other. Thus, the first housing 10 is moved to the left end of the television device 3, and the second housing 11 is moved to the right end of the television device 3. In this manner, the left channel speaker 100-1 is arranged to emit the sound from a left-end lower portion of the television device 3 toward the front. In addition, the left surround channel speaker 100-2 is arranged to emit the sound from the left-end lower portion of the television device 3 toward the front left. Further, the right channel speaker 110-1 is arranged to emit the sound from a right-end lower portion of the television device 3 toward the front. In addition, the right surround channel speaker 110-2 is arranged to emit the sound from the right-end lower portion of the television device 3 toward the front right.

Thus, when the sound bar device 1 is operated in the default reproduction mode, the left channel audio signal is emitted by the left channel speaker 100-1 from the left-end lower portion of the television device 3 toward the front, and the left surround channel audio signal is emitted by the left surround channel speaker 100-2 from the left-end lower portion of the television device 3 toward the front left. In addition, the right channel audio signal is emitted by the right channel speaker 110-1 from the right-end lower portion of the television device 3 toward the front, and the right surround channel audio signal is emitted by the right surround channel speaker 110-2 from the right-end lower portion of the television device 3 toward the front right. In this manner, an optimum surround sound environment corresponding to the screen width of the television device 3 can be achieved.

Figure 7:
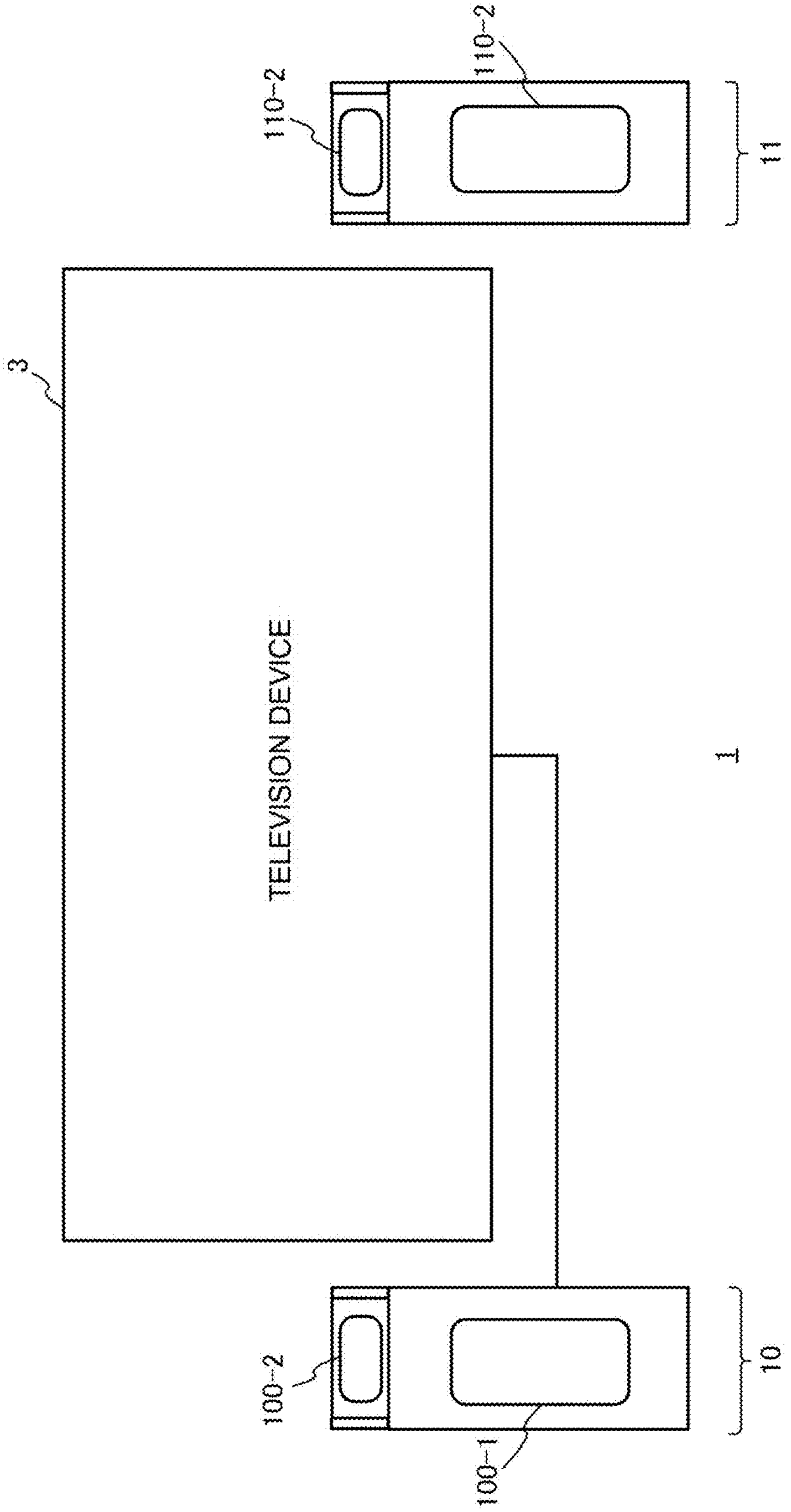
FIG. 7 is an explanatory view for illustrating an installation example of the sound bar device (1) in a first channel change reproduction mode.

FIG. 7 is an explanatory view for illustrating an installation example of the sound bar device 1 in the first channel change reproduction mode.

In the home theater system illustrated in FIG. 1, in a case in which, for example, the television device 3 is replaced with a television device having a larger size and thus the width of the sound bar device 1 has become smaller than the screen width of the television device 3, as illustrated in FIG. 7, the first housing 10 and the second housing 11 are separated from each other. Thus, the first housing 10 is moved to the left end of the television device 3, and is installed with the left side surface thereof facing upward so that the left surround channel speaker 100-2 is positioned on the upper side. In addition, the second housing 11 is moved to the right end of the television device 3, and is installed with the right side surface thereof facing upward so that the right surround channel speaker 110-2 is positioned on the upper side. In this manner, the left channel speaker 100-1 is arranged to emit the sound from the left end of the television device 3 toward the front, and the left surround channel speaker 100-2 is arranged to emit the sound from the left end of the television device 3 toward the upper front. Further, the right channel speaker 110-1 is arranged to emit the sound from the right end of the television device 3 toward the front, and the right surround channel speaker 110-2 is arranged to emit the sound from the right end of the television device 3 toward the upper front.

Thus, when the sound bar device 1 is operated in the first channel change reproduction mode, the left channel audio signal is emitted by the left channel speaker 100-1 from the left end of the television device 3 toward the front, and the left height channel audio signal is emitted by the left surround channel speaker 100-2 from the left end of the television device 3 toward the upper front. Further, the right channel audio signal is emitted by the right channel speaker 110-1 from the right end of the television device 3 toward the front, and the right height channel audio signal is emitted by the right surround channel speaker 110-2 from the right end of the television device 3 toward the upper front. In this manner, an optimum surround sound environment corresponding to the screen width of the television device 3 can be achieved.

Figure 8:
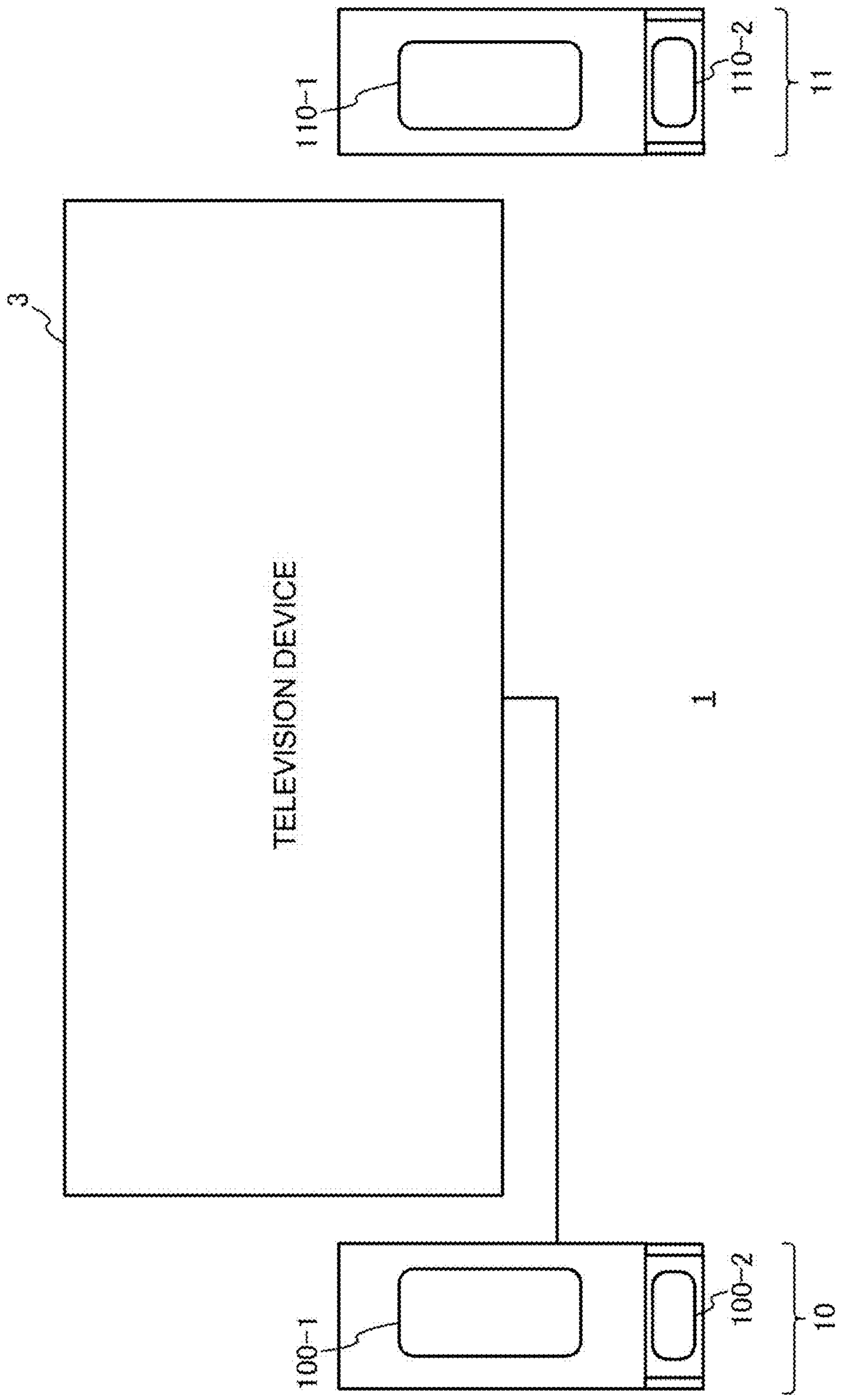
FIG. 8 is an explanatory view for illustrating an installation example of the sound bar device (1) in a second channel change reproduction mode.

FIG. 8 is an explanatory view for illustrating an installation example of the sound bar device 1 in the second channel change reproduction mode.

In the home theater system illustrated in FIG. 1, in a case in which, for example, the television device 3 is replaced with a television device having a larger size and thus the width of the sound bar device 1 has become smaller than the screen width of the television device 3, as illustrated in FIG. 8, the first housing 10 and the second housing 11 are separated from each other. Thus, the first housing 10 is moved to the left end of the television device 3, and is installed with the left side surface thereof facing downward so that the left surround channel speaker 100-2 is positioned on the lower side. In addition, the second housing 11 is moved to the right end of the television device 3, and is installed with the right side surface thereof facing downward so that the right surround channel speaker 110-2 is positioned on the lower side. In this manner, the left channel speaker 100-1 is arranged to emit the sound from the left end of the television device 3 toward the front, and the left surround channel speaker 100-2 is arranged to emit the sound from the left end of the television device 3 toward the lower front. Further, the right channel speaker 110-1 is arranged to emit the sound from the right end of the television device 3 toward the front, and the right surround channel speaker 110-2 is arranged to emit the sound from the left end of the television device 3 toward the lower front.

Thus, when the sound bar device 1 is operated in the second channel change reproduction mode, the left channel audio signal is emitted by the left channel speaker 100-1 from the left end of the television device 3 toward the front, and the right channel audio signal is emitted by the right channel speaker 110-1 from the right end of the television device 3 toward the front. Further, the subwoofer channel audio signal is emitted by the left surround channel speaker 100-2 and the right surround channel speaker 110-2 from the right and left ends of the television device 3 toward the lower front. In this manner, an optimum surround sound environment corresponding to the screen width of the television device 3 can be achieved.

In the above, the first embodiment of the present invention has been described.

According to this embodiment, the second housing 11 including the right channel speaker 110-1 and the right surround channel speaker 110-2 is mountable on and removable from the first housing 10 including the left channel speaker 100-1 and the left surround channel speaker 100-2. Thus, when the width of the sound bar device 1 is narrow as compared with the screen width of the television device 3, the first housing 10 and the second housing 11 can be separated from each other so that those housings are arranged in accordance with the screen width of the television device 3. Thus, an optimum surround sound environment corresponding to the screen width of the television device 3 can be achieved.

Further, in this embodiment, in the case of the default reproduction mode, the first housing 10 which is the main housing extracts and reproduces, from the multi-channel audio signal received from the television device 3, audio signals of the left channel and the left surround channel, and outputs the reproduced audio signals from the left channel speaker 100-1 and the left surround channel speaker 100-2, respectively. In addition, the first housing 10 which is the main housing extracts audio signals of the right channel and the right surround channel, and transmits a multi-channel audio signal including the audio signals of those channels to the second housing 11 which is the sub-housing. Then, the second housing 11 which is the sub-housing extracts and reproduces, from the multi-channel audio signal received from the first housing 10 which is the main housing, audio signals of the right channel and the right surround channel, and outputs the reproduced audio signals from the right channel speaker 110-1 and the right surround channel speaker 110-2, respectively.

Further, in the case of the first channel change reproduction mode, the first housing 10 which is the main housing extracts and reproduces, from the multi-channel audio signal received from the television device 3, audio signals of the left channel and the left height channel, and outputs the reproduced audio signals from the left channel speaker 100-1 and the left surround channel speaker 100-2, respectively. In addition, the first housing 10 which is the main housing extracts audio signals of the right channel and the right height channel, and transmits a multi-channel audio signal including those audio signals to the second housing 11 which is the sub-housing. Then, the second housing 11 which is the sub-housing extracts and reproduces, from the multi-channel audio signal received from the first housing 10 which is the main housing, audio signals of the right channel and the right height channel, and outputs the reproduced audio signals from the right channel speaker 110-1 and the right surround channel speaker 110-2, respectively.

Further, in the case of the second channel change reproduction mode, the first housing 10 which is the main housing extracts and reproduces, from the multi-channel audio signal received from the television device 3, audio signals of the left channel and the subwoofer channel, and outputs the reproduced audio signals from the left channel speaker 100-1 and the left surround channel speaker 100-2, respectively. In addition, the first housing 10 which is the main housing extracts audio signals of the right channel and the subwoofer channel, and transmits a multi-channel audio signal including those audio signals to the second housing 11 which is the sub-housing. Then, the second housing 11 which is the sub-housing extracts and reproduces, from the multi-channel audio signal received from the first housing 10 which is the main housing, audio signals of the right channel and the subwoofer channel, and outputs the reproduced audio signals from the right channel speaker 110-1 and the right surround channel speaker 110-2, respectively.

Thus, according to this embodiment, in the case of the arrangement in which the first housing 10 and the second housing 11 are separated from each other, even in any of the installation examples illustrated in FIG. 6 to FIG. 8, the audio signal of each channel can be emitted from an appropriate position. Accordingly, the flexibility of installation of each of the first housing 10 and the second housing 11 is increased. Thus, the convenience is improved.

Further, in this embodiment, the first housing 10 includes the leg portion 109. Thus, even when the first housing 10 is vertically placed with the left side surface thereof being directed downward, the left surround channel speaker 100-2 is prevented from coming into contact with the installation surface, and thus the sound can be emitted from the left surround channel speaker 100-2 toward the lower front. Similarly, the second housing 11 includes the leg portion 119. Thus, even when the second housing 11 is vertically placed with the right side surface thereof being directed downward, the right surround channel speaker 110-2 is prevented from coming into contact with the installation surface, and thus the sound can be emitted from the right surround channel speaker 110-2 toward the lower front. In this manner, the flexibility of installation of each of the first housing 10 and the second housing 11 is further increased. Thus, the convenience is improved.

Second Embodiment

Figure 12:
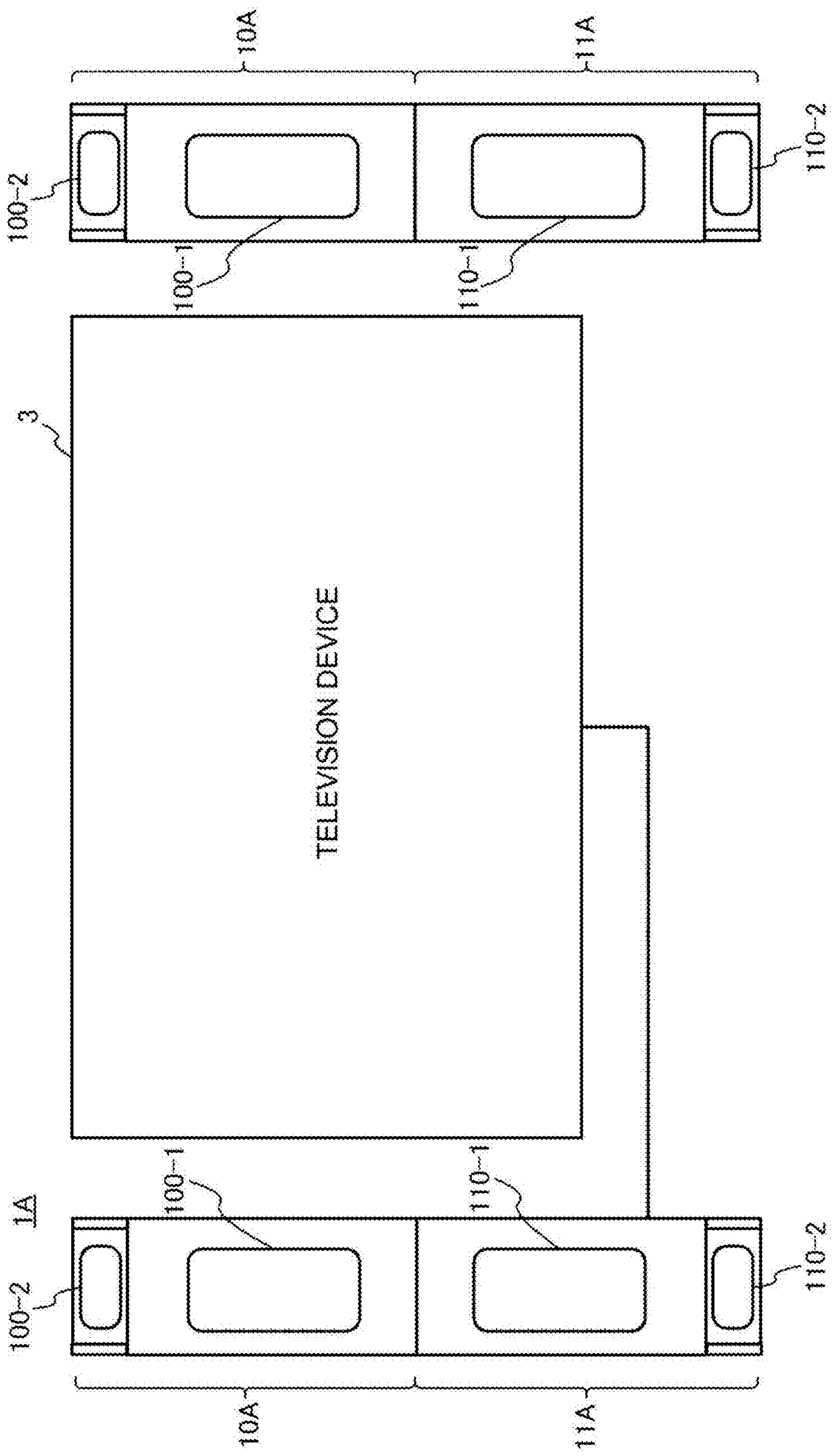
FIG. 12 is an explanatory view for illustrating an installation example of the sound bar devices (1A) in a third channel change reproduction mode.
Figure 13:
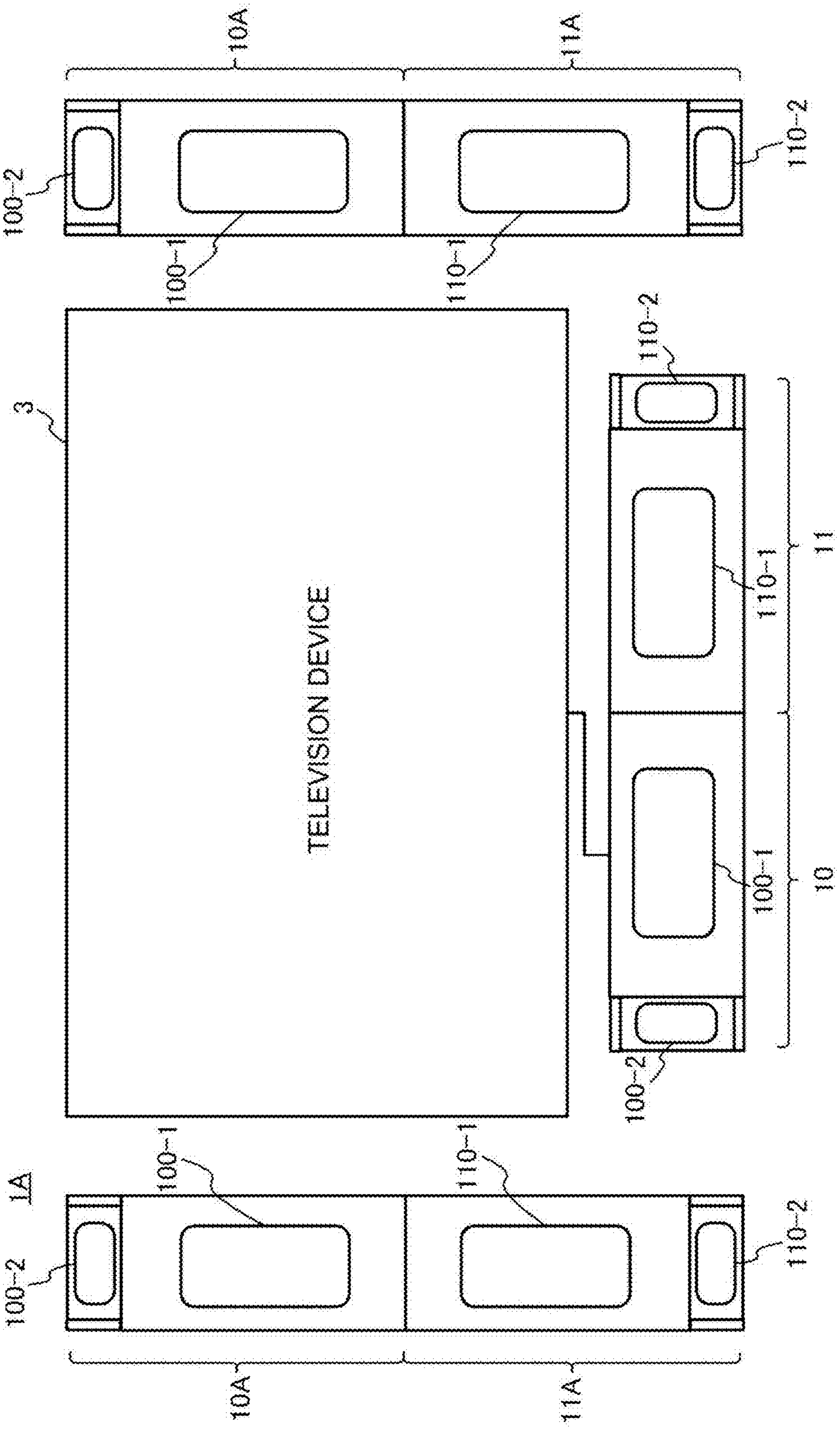
FIG. 13 is an explanatory view for illustrating an installation example of the sound bar devices (1A) in a fourth channel change reproduction mode.

In the above-mentioned first embodiment, one sound bar device 1 is combined with the television device 3 to construct the home theater system. In contrast, in a second embodiment of the present invention, as illustrated in FIG. 12 and FIG. 13, two or three sound bar devices 1A are combined with the television device 3 to construct the home theater system.

In this case, one sound bar device 1A serves as a master and another sound bar device 1A serves as a slave, and a main housing of the master receives the multi-channel audio signal from the television device 3. Then, the main housing of the master extracts and reproduces the audio signals of the channels assigned to the speakers included in the main housing, and outputs the reproduced audio signals from those speakers. In addition, the main housing of the master extracts the audio signals of the channels assigned to the speakers included in a sub-housing of the master, a main housing of the slave, and a sub-housing of the slave, and transmits the audio signals to the respective housings. Further, the sub-housing of the master, the main housing of the slave, and the sub-housing of the slave reproduce the respective audio signals received from the main housing of the master, and output the reproduced audio signals from the own speakers to which the channels of those audio signals are assigned.

Figure 2:
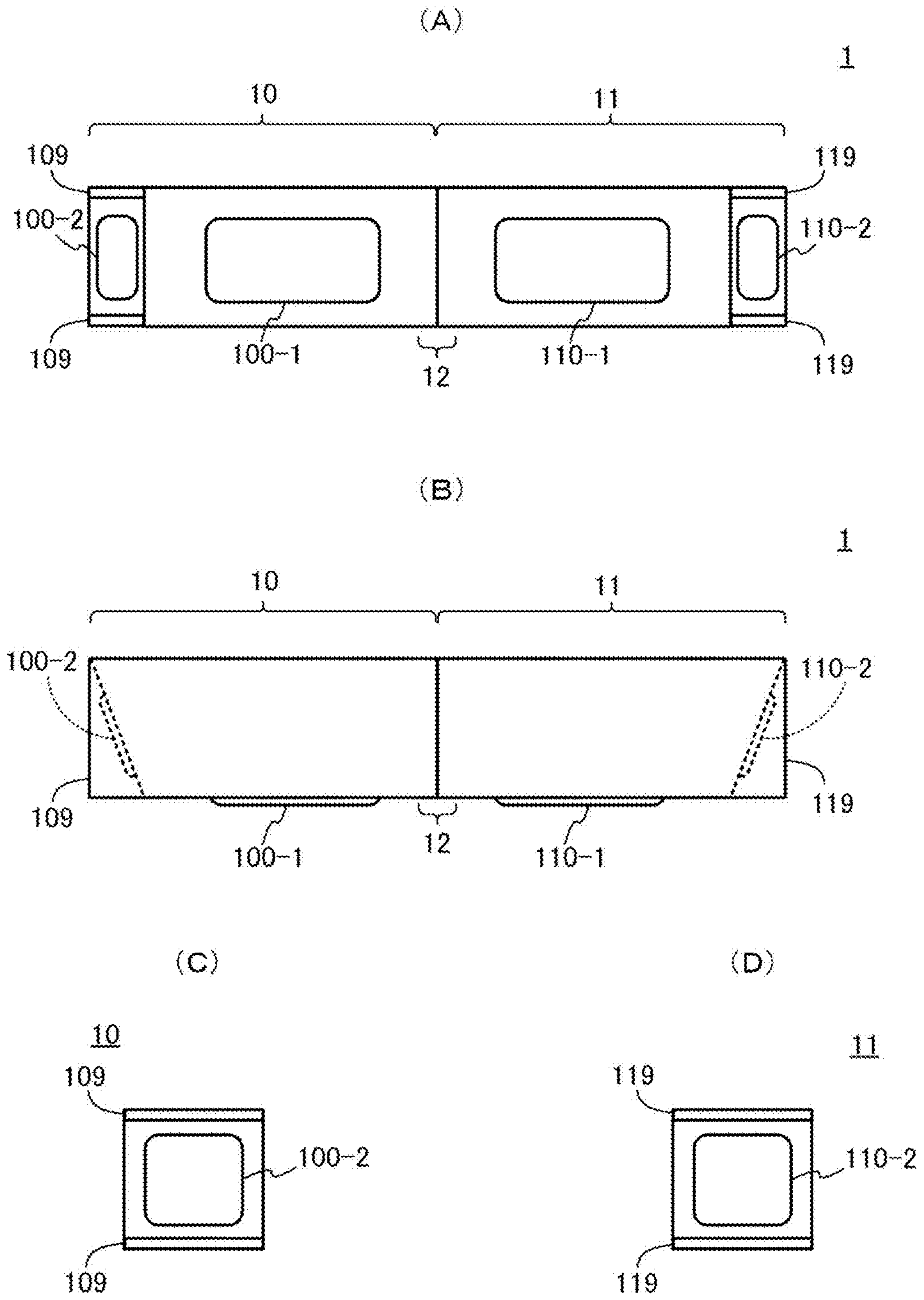
FIG. 2(A) to FIG. 2(D) are a schematic front view, a schematic top view, a schematic left side view, and a schematic right side view of the sound bar device (1), respectively.

Here, the sound bar device 1A according to this embodiment is different from the sound bar device 1 according to the first embodiment illustrated in FIG. 2 in that a first housing 10A is used as the main housing in place of the first housing 10, and a second housing 11A is used as the sub-housing in place of the second housing 11. Other points are similar to those of the sound bar device 1 according to the first embodiment illustrated in FIG. 2.

Figure 9:
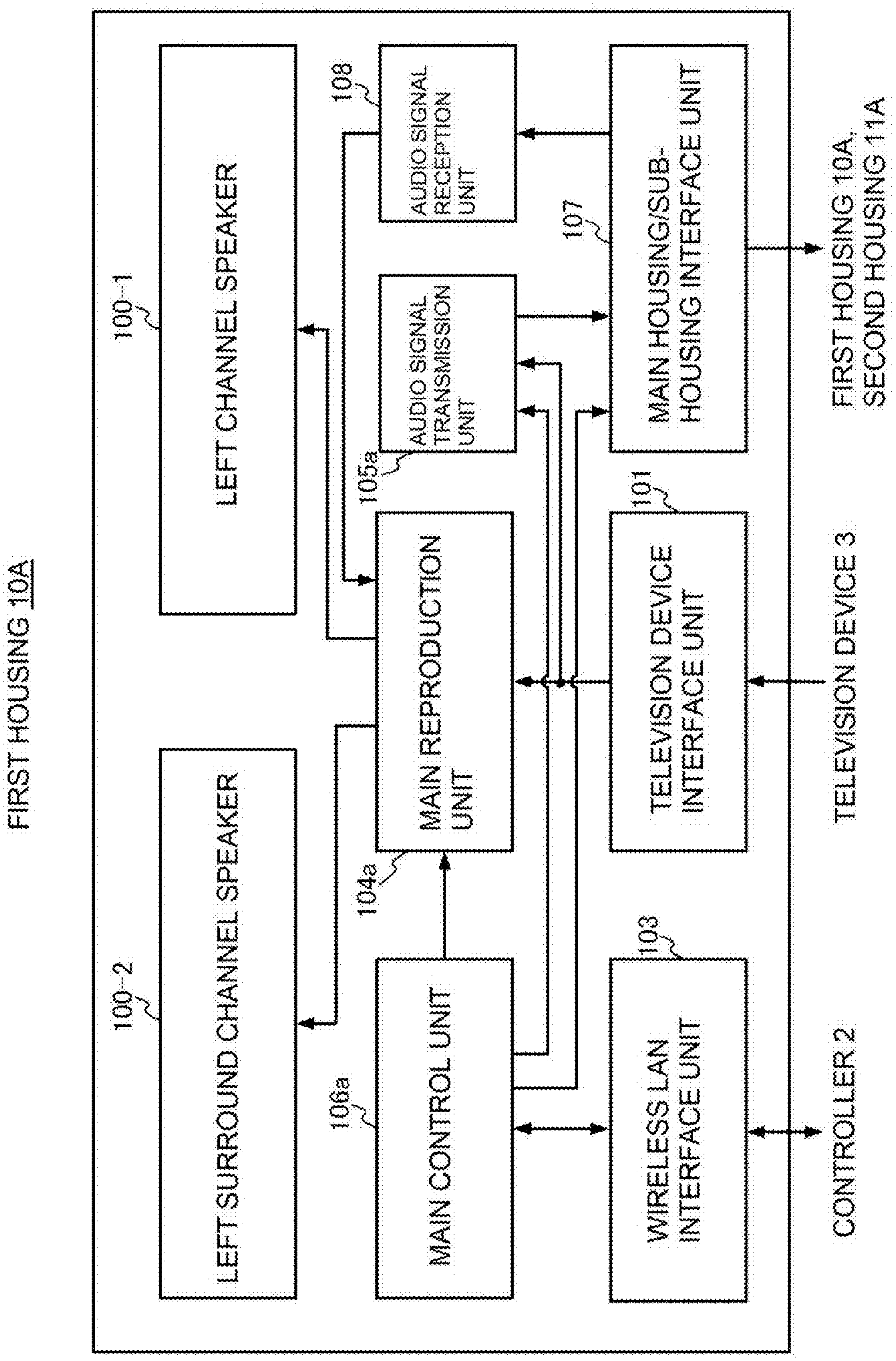
FIG. 9 is a schematic functional configuration diagram of a first housing (10A) which is a main housing of a sound bar device (1A) according to a second embodiment of the present invention.

FIG. 9 is a schematic functional configuration diagram of the first housing 10A which is the main housing.

The first housing 10A illustrated in FIG. 9 is different from the first housing 10 illustrated in FIG. 3 in that a main housing/sub-housing interface unit 107 is provided in place of the sub-housing interface unit 102, an audio signal reception unit 108 is provided, a main reproduction unit 104*a* is used in place of the main reproduction unit 104, an audio signal transmission unit 105*a* is used in place of the audio signal transmission unit 105, and a main control unit 106*a* is used in place of the main control unit 106. Other points are similar to those of the first housing 10 illustrated in FIG. 3.

The main housing/sub-housing interface unit 107 is a communication interface for connecting to the second housing 11A which is the sub-housing of the own sound bar device 1A and the first housing 10A which is the main housing and the second housing 11A which is the sub-housing of another sound bar device 1A constructing the home theater system together with the own sound bar device 1A through short-range wireless communication such as Bluetooth (trademark).

When the own sound bar device 1A is set as the slave, the audio signal reception unit 108 receives, from the first housing 10A which is the main housing of the another sound bar device 1A set as the master, a multi-channel audio signal including the audio signals of the channels assigned to the speakers 100-1 and 100-2 included in the main housing.

The main reproduction unit 104*a* has the following function in addition to the function of the main reproduction unit 104 of the first housing 10 illustrated in FIG. 3. That is, when the own sound bar device 1A is set as the slave, the own sound bar device 1A extracts and reproduces, from the multi-channel audio signal received by the audio signal reception unit 108, the audio signals of the respective channels assigned to the speakers 100-1 and 100-2 included in the main housing, and outputs the reproduced audio signals from the respective speakers 100-1 and 100-2.

The audio signal transmission unit 105*a* has the following function in addition to the function of the audio signal transmission unit 105 of the first housing 10 illustrated in FIG. 3. That is, when the own sound bar device 1A is set as the master, the audio signal transmission unit 105*a* extracts, from the multi-channel audio signal received from the television device 3 via the television device interface unit 101, the audio signals of the channels assigned to the speakers 110-1 and 110-2 included in the sub-housing of the own sound bar device 1A, and transmits a multi-channel audio signal including the extracted audio signals of the channels from the main housing/sub-housing interface unit 107 to the second housing 11A which is the sub-housing of the own sound bar device 1A. In addition, the audio signal transmission unit 105*a* extracts the audio signals of the respective channels assigned to the speakers 100-1 and 100-2 or the speakers 110-1 and 110-2 included in each of the first housing 10A which is the main housing and the second housing 11A which is the sub-housing of the another sound bar device 1A constructing the home theater system together with the own sound bar device 1A, and transmits a multi-channel audio signal including the extracted audio signals of the channels from the main housing/sub-housing interface unit 107 to the corresponding first housing 10A or second housing 11A.

The main control unit 106*a* has the following function in addition to the function of the main control unit 106 of the first housing 10 illustrated in FIG. 3. That is, in a case in which the own sound bar device 1A is set as the master, when the reproduction mode designated by the channel change instruction received from the controller 2 via the wireless LAN interface unit 103 is a third channel change reproduction mode (see FIG. 12) of reproducing the audio signals under a state in which the two sound bar devices 1A are vertically placed and arranged on the right and the left of the television device 3, or a fourth channel change reproduction mode (see FIG. 13) of reproducing the audio signals under a state in which one of three sound bar devices 1A is horizontally placed and arranged at a lower-portion middle of the television device 3 and the remaining two thereof are vertically placed and arranged on the right and the left of the television device 3, the main control unit 106*a* receives, from the controller 2 via the wireless LAN interface unit 103, an installation position of each of the sound bar devices 1A forming the home theater (whether the sound bar device 1A is installed on the left side of the television device 3, installed on the right side thereof, or installed at the lower-portion middle thereof), and an installation state of each of the sound bar devices 1A installed on the right and the left (whether the sound bar device 1A is vertically placed with the first housing 10A being arranged on the upper side or the sound bar device 1A is vertically placed with the first housing 10A being arranged on the lower side). Then, the main control unit 106*a* changes, based on the installation position and the installation state, the channels assigned to the speakers included in the first housing 10 which is the main housing and the second housing 11 which is the sub-housing of each of the own sound bar device 1A and the another sound bar device 1A constructing the home theater system together with the own sound bar device 1A.

Further, when the own sound bar device 1A is set as the slave, the main control unit 106*a* changes, based on the channel change notification received from the first housing 10A which is the main housing of the sound bar device 1A set as the master, the channels assigned to the left channel speaker 100-1 and the left surround channel speaker 100-2 accommodated in the own main housing.

Specifically, in a case in which the reproduction mode designated by the channel change notification is the third channel change reproduction mode or the fourth channel change reproduction mode, and the installation position of the own sound bar device 1A designated by this channel change notification is the left side of the television device 3, when the installation state of the own sound bar device 1A designated by this channel change notification is vertical placement with the first housing 10A being arranged on the upper side, the main control unit 106*a* changes the channels assigned to the left channel speaker 100-1 and the left surround channel speaker 100-2 to the left channel and the left height channel, respectively, and, when the installation state is vertical placement with the first housing 10A being arranged on the lower side, the main control unit 106*a* changes the channels assigned to the left channel speaker 100-1 and the left surround channel speaker 100-2 to the left channel and the subwoofer channel, respectively.

Further, in a case in which the reproduction mode designated by the channel change notification is the third channel change reproduction mode or the fourth channel change reproduction mode, and the installation position of the own sound bar device 1A designated by this channel change notification is the right side of the television device 3, when the installation state of the own sound bar device 1A designated by this channel change notification is vertical placement with the first housing 10A being arranged on the upper side, the main control unit 106*a* changes the channels assigned to the left channel speaker 100-1 and the left surround channel speaker 100-2 to the right channel and the right height channel, respectively, and, when the installation state is vertical placement with the first housing 10A being arranged on the lower side, the main control unit 106*a* changes the channels assigned to the left channel speaker 100-1 and the left surround channel speaker 100-2 to the right channel and the subwoofer channel, respectively.

Further, when the reproduction mode designated by the channel change notification is the fourth channel change reproduction mode, and the installation position of the own sound bar device 1A designated by the channel change notification is the lower-portion middle of the television device 3, the main control unit 106*a* changes the channels assigned to the left channel speaker 100-1 and the left surround channel speaker 100-2 to the center channel.

Similarly to the function configuration of the first housing 10 which is the main housing illustrated in FIG. 3, the function configuration of the first housing 10A which is the main housing illustrated in FIG. 9 may also be implemented in the form of hardware by an integrated logic IC such as an ASIC or an FPGA, or may be implemented in the form of software by a computer such as a DSP.

Figure 10:
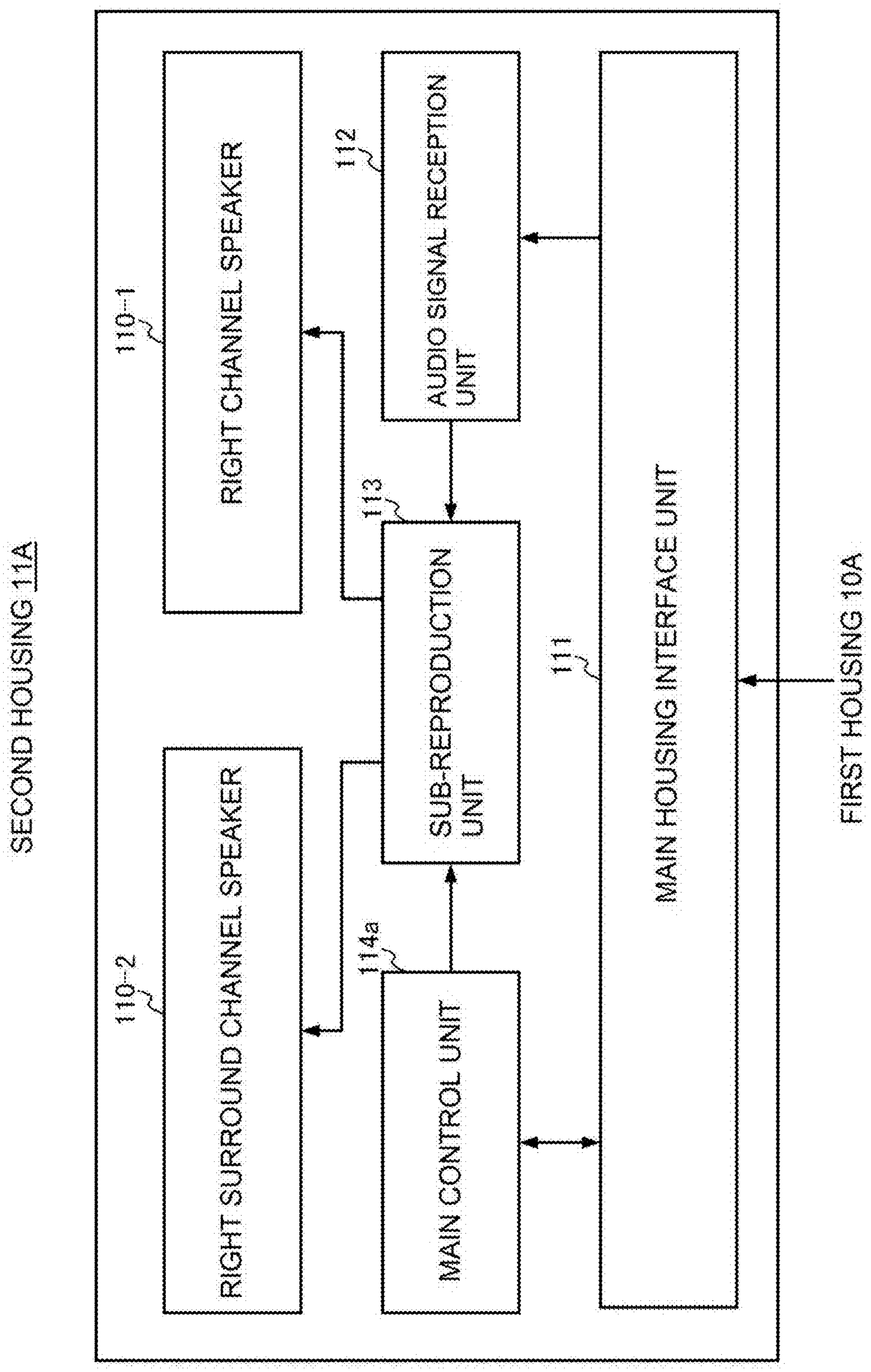
FIG. 10 is a schematic functional configuration diagram of a second housing (11A) which is a sub-housing of the sound bar device (1A) according to the second embodiment of the present invention.

FIG. 10 is a schematic functional configuration diagram of the second housing 11A which is the sub-housing.

The second housing 11A illustrated in FIG. 10 is different from the second housing 11 illustrated in FIG. 4 in that a main control unit 114*a* is used in place of the main control unit 114. Other points are similar to those of the second housing 11 illustrated in FIG. 4.

The main control unit 114*a* has the following function in addition to the function of the main control unit 114 of the second housing 11 illustrated in FIG. 4. That is, when the reproduction mode designated by the channel change notification received from the first housing 10A which is the main housing of the sound bar device 1A set as the master via the main housing interface unit 111 is the third channel change reproduction mode or the fourth channel change reproduction mode, the main control unit 114*a* changes, based on the installation position and the installation state of the own sound bar device 1A, the channels assigned to the right channel speaker 110-1 and the right surround channel speaker 110-2 accommodated in the own sub-housing.

Specifically, in a case in which the reproduction mode designated by the channel change notification is the third channel change reproduction mode or the fourth channel change reproduction mode, and the installation position of the own sound bar device 1A designated by this channel change notification is the left side of the television device 3, when the installation state of the own sound bar device 1A designated by this channel change notification is vertical placement with the first housing 10A being arranged on the upper side, the main control unit 114*a* changes the channels assigned to the right channel speaker 110-1 and the right surround channel speaker 110-2 to the left channel and the subwoofer channel, respectively, and, when the installation state is vertical placement with the first housing 10A being arranged on the lower side, the main control unit 114*a* changes the channels assigned to the right channel speaker 110-1 and the right surround channel speaker 110-2 to the left channel and the left height channel, respectively.

Further, in a case in which the reproduction mode designated by the channel change notification is the third channel change reproduction mode or the fourth channel change reproduction mode, and the installation position of the own sound bar device 1A designated by this channel change notification is the right side of the television device 3, when the installation state of the own sound bar device 1A designated by this channel change notification is vertical placement with the first housing 10A being arranged on the upper side, the main control unit 114*a* changes the channels assigned to the right channel speaker 110-1 and the right surround channel speaker 110-2 to the right channel and the subwoofer channel, respectively, and, when the installation state is vertical placement with the first housing 10A being arranged on the lower side, the main control unit 114*a* changes the channels assigned to the right channel speaker 110-1 and the right surround channel speaker 110-2 to the right channel and the right height channel, respectively.

Further, when the reproduction mode designated by the channel change notification is the fourth channel change reproduction mode, and the installation position of the own sound bar device 1A designated by the channel change notification is the lower-portion middle of the television device 3, the main control unit 114*a* changes the channels assigned to the right channel speaker 110-1 and the right surround channel speaker 110-2 to the center channel.

Similarly to the function configuration of the second housing 11 which is the sub-housing illustrated in FIG. 4, the function configuration of the second housing 11A which is the sub-housing illustrated in FIG. 10 may also be implemented in the form of hardware by an integrated logic IC such as an ASIC or an FPGA, or may be implemented in the form of software by a computer such as a DSP.

Figure 11:
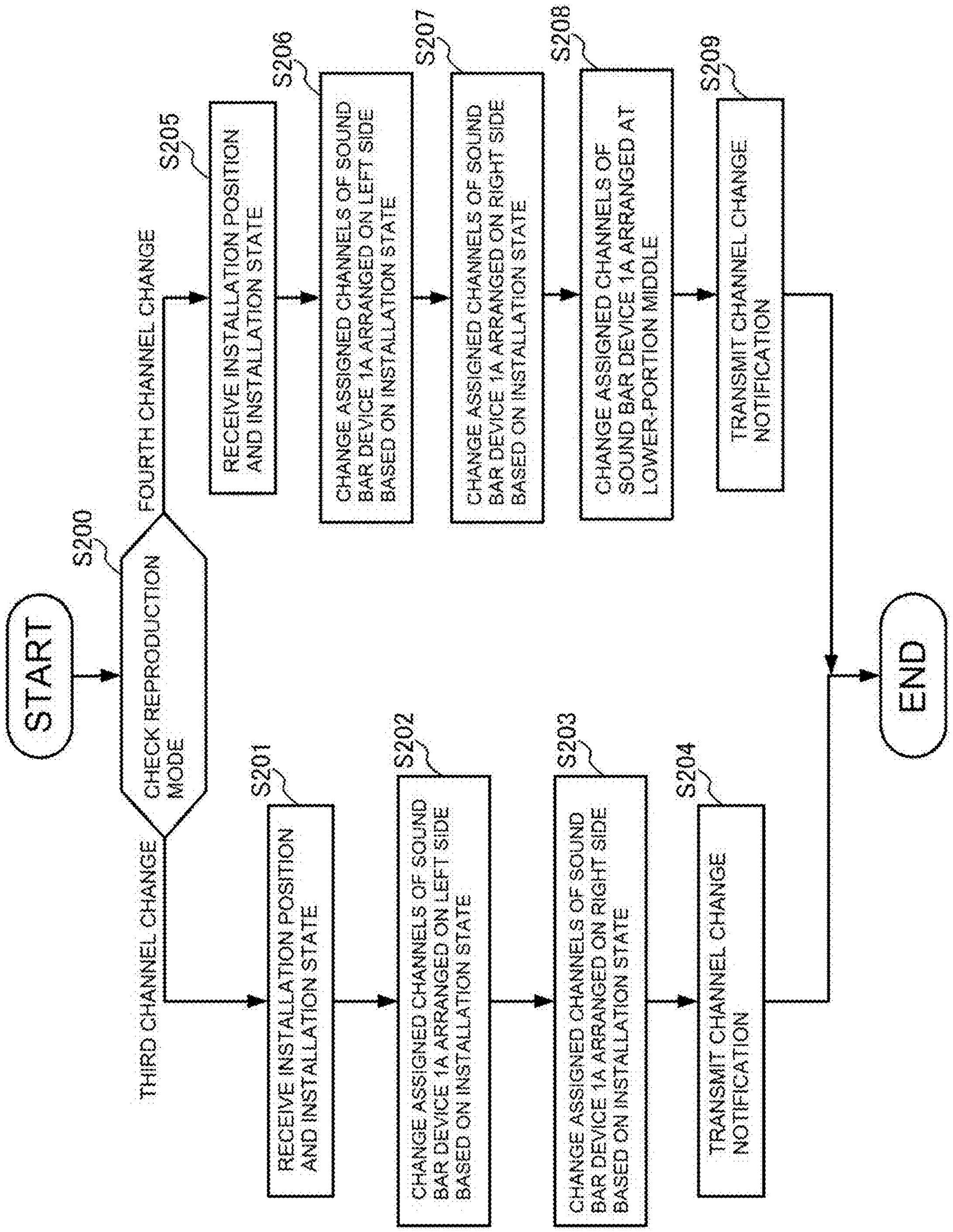
FIG. 11 is an explanatory flow chart for illustrating operation mode setting processing of the sound bar device (1A) set as a master, when two or three sound bar devices (1A) are combined with a television device (3) to construct a home theater system.

FIG. 11 is an explanatory flow chart for illustrating operation mode setting processing of the sound bar device 1A set as the master, when two or three sound bar devices 1A are combined with the television device 3 to construct the home theater system.

It is assumed that the main control unit 106*a* of the first housing 10A which is the main housing and the main control unit 114*a* of the second housing 11A which is the sub-housing recognize whether the own sound bar device 1A is set as the master or set as the slave, and the first housing 10A which is the main housing of the sound bar device 1 set as the master recognizes, in addition to address information on the second housing 11A which is the sub-housing of the own sound bar device 1, address information on each of the first housing 10A which is the main housing and the second housing 11A which is the sub-housing of the sound bar device 1A set as the slave. Further, it is assumed that the first housing 10A which is the main housing and the second housing 11A which is the sub-housing of the sound bar device 1A set as the slave recognize address information on the first housing 10A which is the main housing of the sound bar device 1 set as the master.

This flow is started when, in the first housing 10A which is the main housing of the sound bar device 1A set as the master, the wireless LAN interface unit 103 receives the channel change instruction accompanying the designation of the third channel change reproduction mode or the fourth channel change reproduction mode from the controller 2.

First, the main control unit 106*a* checks the reproduction mode designated by the channel change instruction (Step S200). Then, when the designated reproduction mode is the third channel change reproduction mode of reproducing the audio signals under a state in which the two sound bar devices 1A are vertically placed and arranged on the right and the left of the television device 3 ("THIRD CHANNEL CHANGE" in Step S200), the main control unit 106*a* inquires of the controller 2, via the wireless LAN interface unit 103, about the installation position of each of the two sound bar devices 1A (whether the sound bar device 1A is installed on the left side of the television device 3 or installed on the right side thereof) and the installation state thereof (whether the sound bar device 1A is vertically placed with the first housing 10A being arranged on the upper side or the sound bar device 1A is vertically placed with the first housing 10A being arranged on the lower side), and receives the installation position and the installation state of each of the two sound bar devices 1A from the controller 2 (Step S201).

Next, the main control unit 106*a* changes the channels assigned to the respective speakers 100-1, 100-2, 110-1, and 110-2 accommodated in the sound bar device 1A installed on the left side of the television device 3, based on the installation state of this sound bar device 1A (Step S202).

Specifically, when the sound bar device 1A installed on the left side of the television device 3 is vertically placed with the first housing 10A being arranged on the upper side, the channels assigned to the left channel speaker 100-1 and the right channel speaker 110-1 accommodated in this sound bar device 1A are changed to the left channel, and the channel assigned to the left surround channel speaker 100-2 is changed to the left height channel. In addition, the channel assigned to the right surround channel speaker 110-2 is changed to the subwoofer channel. In addition, when the sound bar device 1A installed on the left side of the television device 3 is vertically placed with the first housing 10A being arranged on the lower side, the channels assigned to the left channel speaker 100-1 and the right channel speaker 110-1 accommodated in this sound bar device 1A are changed to the left channel, and the channel assigned to the right surround channel speaker 110-2 is changed to the left height channel. In addition, the channel assigned to the left surround channel speaker 100-2 is changed to the subwoofer channel.

In addition, the main control unit 106*a* changes the channels assigned to the respective speakers 100-1, 100-2, 110-1, and 110-2 accommodated in the sound bar device 1A installed on the right side of the television device 3, based on the installation state of this sound bar device 1A (Step S203).

Specifically, when the sound bar device 1A installed on the right side of the television device 3 is vertically placed with the first housing 10A being arranged on the upper side, the channels assigned to the left channel speaker 100-1 and the right channel speaker 110-1 accommodated in this sound bar device 1A are changed to the right channel, and the channel assigned to the left surround channel speaker 100-2 is changed to the right height channel. In addition, the channel assigned to the right surround channel speaker 110-2 is changed to the subwoofer channel. Further, when the sound bar device 1A installed on the right side of the television device 3 is vertically placed with the first housing 10A being arranged on the lower side, the channels assigned to the left channel speaker 100-1 and the right channel speaker 110-1 accommodated in this sound bar device 1A are changed to the right channel, and the channel assigned to the right surround channel speaker 110-2 is changed to the right height channel. In addition, the channel assigned to the left surround channel speaker 100-2 is changed to the subwoofer channel.

Then, the main control unit 106*a* transmits, to the second housing 11A which is the sub-housing of the own sound bar device 1A via the main housing/sub-housing interface unit 107, the installation position and the installation state of the own sound bar device 1A and the channel change notification accompanying the designation of the third channel change reproduction mode, and transmits, to the first housing 10A which is the main housing and the second housing 11A which is the sub-housing of the sound bar device 1A set as the slave, the installation position and the installation state of this sound bar device 1A and the channel change notification accompanying the designation of the third channel change reproduction mode (Step S204).

Further, when the reproduction mode designated by the channel change instruction is the fourth channel change reproduction mode of reproducing the audio signals under a state in which one of the three sound bar devices 1A is horizontally placed at the lower-portion middle of the television device 3 and the remaining two thereof are vertically placed and arranged on the right and the left of the television device 3 ("FOURTH CHANNEL CHANGE" in Step S200), the main control unit 106*a* inquires of the controller 2, via the wireless LAN interface unit 103, about the installation position of each of the three sound bar devices 1A (whether the sound bar device 1A is installed on the left side of the television device 3, installed on the right side thereof, or installed at the lower-portion middle thereof) and the installation state of each of the two sound bar devices 1A installed on the right and the left of the television device 3 (whether the sound bar device 1A is vertically placed with the first housing 10A being arranged on the upper side or the sound bar device 1A is vertically placed with the first housing 10A being arranged on the lower side), and receives the installation position of each of the three sound bar devices 1A and the installation state of each of the two sound bar devices 1A installed on the right and the left of the television device 3 from the controller 2 (Step S205).

Next, the main control unit 106*a* changes the channels assigned to the respective speakers 100-1, 100-2, 110-1, and 110-2 accommodated in the sound bar device 1A installed on the left side of the television device 3 based on the installation state of this sound bar device 1A in the same manner as that in Step S202 (Step S206).

Further, the main control unit 106*a* changes the channels assigned to the respective speakers 100-1, 100-2, 110-1, and 110-2 accommodated in the sound bar device 1A installed on the right side of the television device 3 based on the installation state of this sound bar device 1A in the same manner as that in Step S203 (Step S207).

Further, the main control unit 106*a* changes the channels assigned to the respective speakers 100-1, 100-2, 110-1, and 110-2 accommodated in the sound bar device 1A installed at the lower-portion middle of the television device 3 to the center channel (Step S208).

Then, the main control unit 106*a* transmits, to the second housing 11A which is the sub-housing of the own sound bar device 1A via the main housing/sub-housing interface unit 107, the installation position and the installation state of the own sound bar device 1A (when the own sound bar device 1A is installed at the lower-portion middle of the television device 3, the installation state is omitted) and the channel change notification accompanying the designation of the fourth channel change reproduction mode, and transmits, to the first housing 10A which is the main housing and the second housing 11A which is the sub-housing of each of the two sound bar devices 1A set as the slave, the installation position and the installation state of this sound bar device 1A (when this sound bar device 1A is installed at the lower-portion middle of the television device 3, the installation state is omitted) and the channel change notification accompanying the designation of the fourth channel change reproduction mode (Step S209).

FIG. 12 is an explanatory view for illustrating an installation example of the sound bar devices 1A in the third channel change reproduction mode.

As illustrated in FIG. 12, when the two sound bar devices 1A are vertically placed and arranged on the right and the left of the television device 3 to construct the home theater system, the left channel speaker 100-1 and the right channel speaker 110-1 of the sound bar device 1A installed on the left side of the television device 3 emit the sounds from the left end of the television device 3 toward the front. One of the left surround channel speaker 100-2 and the right surround channel speaker 110-2 emits the sound from the left end of the television device 3 toward the upper front, and another one thereof emits the sound from the left end of the television device 3 toward the lower front. In addition, the left channel speaker 100-1 and the right channel speaker 110-1 of the sound bar device 1A installed on the right side of the television device 3 emit the sounds from the right end of the television device 3 toward the front. One of the left surround channel speaker 100-2 and the right surround channel speaker 110-2 emits the sound from the right end of the television device 3 toward the upper front, and another one thereof emits the sound from the right end of the television device 3 toward the lower front.

Thus, when the installation positions and the installation states of the two sound bar devices 1A constructing the home theater system are input by the controller 2 to the first housing 10A which is the main housing of the sound bar device 1A set as the master so that those sound bar devices 1A are operated in the third channel change reproduction mode, the left channel audio signal is emitted by the left channel speaker 100-1 and the right channel speaker 110-1 of the sound bar device 1A arranged on the left side of the television device 3 from the left end of the television device 3 toward the front, and the left height channel audio signal is emitted by the speaker positioned on the upper side out of the left surround channel speaker 100-2 and the right surround channel speaker 110-2 of the sound bar device 1A arranged on the left side of the television device 3 from the left end of the television device 3 toward the upper front. Further, the right channel audio signal is emitted by the left channel speaker 100-1 and the right channel speaker 110-1 of the sound bar device 1A arranged on the right side of the television device 3 from the right end of the television device 3 toward the front, and the right height channel audio signal is emitted by the speaker positioned on the upper side out of the left surround channel speaker 100-2 and the right surround channel speaker 110-2 of the sound bar device 1A arranged on the right side of the television device 3 from the right end of the television device 3 toward the upper front. Moreover, the subwoofer channel audio signal is emitted by the speakers positioned on the lower side out of the left surround channel speakers 100-2 and the right surround channel speakers 110-2 of the respective two sound bar devices 1A arranged on the right and the left of the television device 3 from the right and left ends of the television device 3 toward the lower front. Thus, an optimum surround sound environment corresponding to the screen width of the television device 3 can be achieved.

FIG. 13 is an explanatory view for illustrating an installation example of the sound bar devices 1A in the fourth channel change reproduction mode.

As illustrated in FIG. 13, when one of the three sound bar devices 1A is horizontally placed at the lower-portion middle of the television device 3 and the remaining two thereof are vertically placed on the right and the left of the television devices 3 to construct the home theater system, the left channel speaker 100-1 and the right channel speaker 110-1 of the sound bar device 1A installed on the left side of the television device 3 emit the sounds from the left end of the television device 3 toward the front. One of the left surround channel speaker 100-2 and the right surround channel speaker 110-2 thereof emits the sound from the left end of the television device 3 toward the upper front, and another one thereof emits the sound from the left end of the television device 3 toward the lower front. Further, the left channel speaker 100-1 and the right channel speaker 110-1 of the sound bar device 1A installed on the right side of the television device 3 emit the sounds from the right end of the television device 3 toward the front. One of the left surround channel speaker 100-2 and the right surround channel speaker 110-2 thereof emits the sound from the right end of the television device 3 toward the upper front, and another one thereof emits the sound from the right end of the television device 3 toward the lower front. Moreover, the left channel speaker 100-1 and the right channel speaker 110-1 of the sound bar device 1A installed at the lower-portion middle of the television device 3 emit the sounds from the lower-portion middle of the television device 3 toward the front. The left surround channel speaker 100-2 thereof emits the sound from the lower-portion middle of the television device 3 toward the front left, and the right surround channel speaker 110-2 thereof emits the sound from the lower-portion middle of the television device 3 toward the front right.

Thus, when the installation positions of the three sound bar devices 1A constructing the home theater system and the installation states of the two sound bar devices 1A installed on the right and the left of the television device 3 out of those sound bar devices 1A are input by the controller 2 to the first housing 10A which is the main housing of the sound bar device 1A set as the master so that those sound bar devices 1A are operated in the fourth channel change reproduction mode, the left channel audio signal is emitted by the left channel speaker 100-1 and the right channel speaker 110-1 of the sound bar device 1A arranged on the left side of the television device 3 from the left end of the television device 3 toward the front, and the left height channel audio signal is emitted by the speaker positioned on the upper side out of the left surround channel speaker 100-2 and the right surround channel speaker 110-2 of the sound bar device 1A arranged on the left side of the television device 3 from the left end of the television device 3 toward the upper front. Further, the right channel audio signal is emitted by the left channel speaker 100-1 and the right channel speaker 110-1 of the sound bar device 1A arranged on the right side of the television device 3 from the right end of the television device 3 toward the front, and the right height channel audio signal is emitted by the speaker positioned on the upper side out of the left surround channel speaker 100-2 and the right surround channel speaker 110-2 of the sound bar device 1A arranged on the right side of the television device 3 from the right end of the television device 3 toward the upper front. Moreover, the subwoofer channel audio signal is emitted by the speakers positioned on the lower side out of the left surround channel speakers 100-2 and the right surround channel speakers 110-2 of the respective two sound bar devices 1A arranged on the right and the left of the television device 3 from the right and left ends of the television device 3 toward the lower front. Further, the center channel audio signal is emitted by the left channel speaker 100-1 and the right channel speaker 110-1 of the sound bar device 1A arranged at the lower-portion middle of the television device 3 from the lower-portion middle of the television device 3 toward the front, and is also emitted by the left surround channel speaker 100-2 and the right surround channel speaker 110-2 of this sound bar device 1A from the lower-portion middle of the television device 3 toward the front left and the front right. In this manner, an optimum surround sound environment corresponding to the screen width of the television device 3 can be achieved.

In the above, the second embodiment of the present invention has been described.

The present invention is not limited to each of the embodiments described above, and various modifications may be made thereto within the scope of the gist of the present invention.

For example, in each of the embodiments described above, the first housing 10 or 10A is regarded as a main housing, and the second housing 11 or 11A is regarded as a sub-housing. However, the present invention is not limited thereto. The first housing 10 or 10A may be regarded as a sub-housing, and the second housing 11 or 11A may be regarded as a main housing.

In this case, in the first housing 10 which is the sub-housing, in place of the television device interface unit 101, the sub-housing interface unit 102, the wireless LAN interface unit 103, the main reproduction unit 104, the audio signal transmission unit 105, and the main control unit 106 illustrated in FIG. 3, the main housing interface unit 111, the audio signal reception unit 112, the sub-reproduction unit 113, and the main control unit 114 illustrated in FIG. 4 are provided. Further, in the first housing 10A which is the sub-housing, in place of the television device interface unit 101, the main housing/sub-housing interface unit 107, the wireless LAN interface unit 103, the main reproduction unit **104*a*, the audio signal transmission unit 105*a*, the audio signal reception unit 108, and the main control unit 106*a* illustrated in FIG. 9, the main housing interface unit 111, the audio signal reception unit 112, the sub-reproduction unit 113, and the main control unit 114*a* illustrated in FIG. 10** are provided.

Meanwhile, in the second housing 11 which is the main housing, in place of the main housing interface unit 111, the audio signal reception unit 112, the sub-reproduction unit 113, and the main control unit 114 illustrated in FIG. 4, the television device interface unit 101, the sub-housing interface unit 102, the wireless LAN interface unit 103, the main reproduction unit 104, the audio signal transmission unit 105, and the main control unit 106 illustrated in FIG. 3 are provided. Further, in the second housing 11A which is the main housing, in place of the main housing interface unit 111, the audio signal reception unit 112, the sub-reproduction unit 113, and the main control unit 114*a* illustrated in FIG. 10, the television device interface unit 101, the main housing/sub-housing interface unit 107, the wireless LAN interface unit 103, the main reproduction unit 104*a*, the audio signal transmission unit 105*a*, the audio signal reception unit 108, and the main control unit 106*a* illustrated in FIG. 9 are provided. Further, in the embodiments described above, communication between the sound bar device 1 and the controller 2 is held via the access point 4. However, the present invention is not limited thereto. Communication between the sound bar device 1 and the controller 2 may be held by short-range wireless communication such as Bluetooth (trademark).

Further, in the embodiments described above, the case in which the sound bar device 1 is combined with the television device 3 has been described as an example. However, the present invention is not limited thereto. The present invention is widely applicable to a case in which the sound bar device 1 is used in combination with an audio-visual device.

REFERENCE SIGNS LIST

1, 1A: sound bar device 2: controller 3: television device
4: access point 5: network
10, 10A: first housing 11, 11A: second housing 12: mounting/removing mechanism
100-1: left channel speaker
100-2: left surround channel speaker
101: television device interface unit
102: sub-housing interface unit
103: wireless LAN interface unit 104, 104*a*: main reproduction unit
105, 105*a*: audio signal transmission unit
106, 106*a*, 114, 114*a*: main control unit
107: main housing/sub-housing interface unit
108, 112: audio signal reception unit 109, 119: leg portion
110-1: right channel speaker
110-2: right surround channel speaker
111: main housing interface unit 113: sub-reproduction unit

The invention claimed is:

1. A sound bar device, comprising a plurality of speakers, the sound bar device further comprising:

a first housing including, in a front surface thereof, a corresponding one of the plurality of speakers to which a left channel is assigned, and, in a left side surface thereof, a corresponding one of the plurality of speakers to which a left surround channel is assigned; and a second housing including, in a front surface thereof, a corresponding one of the plurality of speakers to which a right channel is assigned, and, in a right side surface thereof, a corresponding one of the plurality of speakers to which a right surround channel is assigned, the second housing being removable from and mountable on a right side of the first housing, wherein one of the first housing and the second housing is a main housing, and another one thereof is a sub-housing, wherein the main housing includes:

external device connection means for connecting to an external device configured to transmit a multi-channel audio signal;

main reproduction means for extracting and reproducing, from the multi-channel audio signal received from the external device, an audio signal of a channel assigned to the corresponding one of the plurality of speakers included in the main housing, and outputting the reproduced audio signal from the corresponding one of the plurality of speakers; and audio signal transmission means for extracting, from the multi-channel audio signal received from the external device, an audio signal of a channel assigned to the corresponding one of the plurality of speakers included in the sub-housing, and transmitting the extracted audio signal to the sub-housing, and wherein the sub-housing includes:

audio signal reception means for receiving the audio signal from the main housing; and sub-reproduction means for reproducing the audio signal received by the audio signal reception means, and outputting the reproduced audio signal from the corresponding one of the plurality of speakers included in the sub-housing.

2. The sound bar device according to claim 1, wherein the main housing further includes channel setting means for changing a channel to be assigned to each of the plurality of speakers, wherein the channel setting means is configured to:

change, when a reproduction mode of the audio signal is set to a first channel change reproduction mode of reproducing the audio signal under a state in which the first housing and the second housing are separated from each other and are each vertically placed with a side surface in which a corresponding one of the plurality of speakers is arranged being directed upward, the channel assigned to the corresponding one of the plurality of speakers arranged in the left side surface of the first housing to a left height channel, and change the channel assigned to the corresponding one of the plurality of speakers arranged in the right side surface of the second housing to a right height channel; and change, when the reproduction mode is set to a second channel change reproduction mode of reproducing the audio signal under a state in which the first housing and the second housing are separated from each other and are each vertically placed with the side surface in which the corresponding one of the plurality of speakers is arranged being directed downward, each of the channel assigned to the corresponding one of the plurality of speakers arranged in the left side surface of the first housing and the channel assigned to the corresponding one of the plurality of speakers arranged in the right side surface of the second housing to a subwoofer channel.

3. The sound bar device according to claim 2, wherein the first housing includes a leg portion configured to prevent the corresponding one of the plurality of speakers arranged in the left side surface and an installation surface from coming into contact with each other when the first housing is installed with the left side surface being directed downward, and wherein the second housing includes a leg portion configured to prevent the corresponding one of the plurality of speakers arranged in the right side surface and an installation surface from coming into contact with each other when the second housing is installed with the right side surface being directed downward.

4. The sound bar device according to claim 3, wherein the main housing further includes:

main-side audio signal reception means for receiving, when the own sound bar device is set as a slave, an audio signal from the main housing of another sound bar device set as a master; and reception means for receiving, when the own sound bar device is set as the master, an arrangement position with respect to the external device of each of the own sound bar device and the another sound bar device set as the slave, and an installation state indicating, for each sound bar device that is vertically placed, which of the first housing and the second housing is directed downward and installed, wherein the main reproduction means is configured to reproduce the audio signal received by the main-side audio signal reception means, and output the reproduced audio signal from the corresponding one of the plurality of speakers included in the main housing, wherein the audio signal transmission means is configured to:

extract, when the own sound bar device is set as the master, the audio signal of the channel assigned to the corresponding one of the plurality of speakers included in the sub-housing of the own sound bar device from the multi-channel audio signal received from the external device, and transmit the extracted audio signal to the sub-housing thereof;

extract, from the multi-channel audio signal, the audio signal of the channel assigned to the corresponding one of the plurality of speakers included in the main housing of the another sound bar device set as the slave, and transmit the extracted audio signal to the main housing thereof; and extract, from the multi-channel audio signal, the audio signal of the channel assigned to the corresponding one of the plurality of speakers included in the sub-housing of the another sound bar device set as the slave, and transmit the extracted audio signal to the sub-housing thereof, and wherein the channel setting means is configured to, in a case in which the reproduction mode is set to a third channel change reproduction mode of reproducing the audio signal under a state in which two sound bar devices are vertically placed and arranged on a right and a left of the external device, when the own sound bar device is set as the master:

assign the left channel to the corresponding one of the plurality of speakers arranged in the front surface of each of the first housing and the second housing of the sound bar device arranged on a left side with respect to the external device, and assign the left height channel and the subwoofer channel to the corresponding one of the plurality of speakers positioned on an upper side and the corresponding one of the plurality of speakers positioned on a lower side, respectively, out of the corresponding one of the plurality of speakers arranged in the left side surface of the first housing thereof and the corresponding one of the plurality of speakers arranged in the right side surface of the second housing thereof; and assign the right channel to the corresponding one of the plurality of speakers arranged in the front surface of each of the first housing and the second housing of the sound bar device arranged on a right side with respect to the external device, and assign the right height channel and the subwoofer channel to the corresponding one of the plurality of speakers positioned on the upper side and the corresponding one of the plurality of speakers positioned on the lower side, respectively, out of the corresponding one of the plurality of speakers arranged in the left side surface of the first housing thereof and the corresponding one of the plurality of speakers arranged in the right side surface of the second housing thereof.

5. The sound bar device according to claim 4, wherein the channel setting means is configured to, in a case in which the reproduction mode is set to a fourth channel change reproduction mode of reproducing the audio signal under a state in which one of three sound bar devices is horizontally placed below the external device and remaining two thereof are vertically placed and arranged on the right and the left of the external device, when the own sound bar device is set as the master:

assign a center channel to the corresponding one of the plurality of speakers arranged in each of the first housing and the second housing of the sound bar device installed below the external device;

assign the left channel to the corresponding one of the plurality of speakers arranged in the front surface of each of the first housing and the second housing of the sound bar device arranged on the left side with respect to the external device, and assign the left height channel and the subwoofer channel to the corresponding one of the plurality of speakers positioned on the upper side and the corresponding one of the plurality of speakers positioned on the lower side, respectively, out of the corresponding one of the plurality of speakers arranged in the left side surface of the first housing thereof and the corresponding one of the plurality of speakers arranged in the right side surface of the second housing thereof; and assign the right channel to the corresponding one of the plurality of speakers arranged in the front surface of each of the first housing and the second housing of the sound bar device arranged on the right side with respect to the external device, and assign the right height channel and the subwoofer channel to the corresponding one of the plurality of speakers positioned on the upper side and the corresponding one of the plurality of speakers positioned on the lower side, respectively, out of the corresponding one of the plurality of speakers arranged in the left side surface of the first housing thereof and the corresponding one of the plurality of speakers arranged in the right side surface of the second housing thereof.

6. A method of setting a sound bar device including speakers of a plurality of channels, the sound bar device including:

a first housing including, in each of a front surface and a left side surface thereof, a corresponding one of the speakers; and a second housing including, in each of a front surface and a right side surface thereof, a corresponding one of the speakers, the second housing being removable from and mountable on a right side of the first housing, the method comprising:

assigning, when each of the first housing and the second housing is installed with a lower surface thereof being directed downward, a left channel to the corresponding one of the speakers arranged in the front surface of the first housing, assigning a left surround channel to the corresponding one of the speakers arranged in the left side surface of the first housing, assigning a right channel to the corresponding one of the speakers arranged in the front surface of the second housing, and assigning a right surround channel to the corresponding one of the speakers arranged in the right side surface of the second housing;

assigning, when the first housing and the second housing are separated from each other and are each vertically placed and installed with a side surface in which a corresponding one of the speakers is arranged being directed upward, the left channel to the corresponding one of the speakers arranged in the front surface of the first housing, assigning a left height channel to the corresponding one of the speakers arranged in the left side surface of the first housing, assigning the right channel to the corresponding one of the speakers arranged in the front surface of the second housing, and assigning a right height channel to the corresponding one of the speakers arranged in the right side surface of the second housing; and assigning, when the first housing and the second housing are separated from each other and are each vertically placed and installed with the side surface in which the corresponding one of the speakers is arranged being directed downward, the left channel to the corresponding one of the speakers arranged in the front surface of the first housing, assigning the right channel to the corresponding one of the speakers arranged in the front surface of the second housing, and assigning a subwoofer channel to each of the corresponding one of the speakers arranged in the left side surface of the first housing and the corresponding one of the speakers arranged in the right side surface of the second housing.

7. The method of setting a sound bar device according to claim 6, further comprising, when two sound bar devices are arranged side by side on a right and a left and are each vertically placed and installed with the left side surface of the first housing or the right side surface of the second housing being directed downward:

assigning the left channel to the corresponding one of the speakers arranged in the front surface of each of the first housing and the second housing of the sound bar device installed on a left side, and assigning the left height channel and the subwoofer channel to the corresponding one of the speakers positioned on an upper side and the corresponding one of the speakers positioned on a lower side, respectively, out of the corresponding one of the speakers arranged in the left side surface of the first housing thereof and the corresponding one of the speakers arranged in the right side surface of the second housing thereof; and assigning the right channel to the corresponding one of the speakers arranged in the front surface of each of the first housing and the second housing of the sound bar device installed on a right side, and assigning the right height channel and the subwoofer channel to the corresponding one of the speakers positioned on the upper side and the corresponding one of the speakers positioned on the lower side, respectively, out of the corresponding one of the speakers arranged in the left side surface of the first housing thereof and the corresponding one of the speakers arranged in the right side surface of the second housing thereof.

8. The method of setting a sound bar device according to claim 6, further comprising, when three sound bar devices are arranged side by side on a right and a left, the sound bar device positioned at a middle is horizontally placed and set with a lower surface thereof being directed downward, and the sound bar device positioned on each of the right and the left is vertically placed and installed with the left side surface of the first housing or the right side surface of the second housing being directed downward:

assigning a center channel to the corresponding one of the speakers arranged in each of the first housing and the second housing of the sound bar device that is horizontally placed and installed at the middle;

assigning the left channel to the corresponding one of the speakers arranged in the front surface of each of the first housing and the second housing of the sound bar device that is vertically placed and installed on the left side, and assigning the left height channel and the subwoofer channel to the corresponding one of the speakers positioned on the upper side and the corresponding one of the speakers positioned on the lower side, respectively, out of the corresponding one of the speakers arranged in the left side surface of the first housing thereof and the corresponding one of the speakers arranged in the right side surface of the second housing thereof; and assigning the right channel to the corresponding one of the speakers arranged in the front surface of each of the first housing and the second housing of the sound bar device that is vertically placed and installed on the right side, and assigning the right height channel and the subwoofer channel to the corresponding one of the speakers positioned on the upper side and the corresponding one of the speakers positioned on the lower side, respectively, out of the corresponding one of the speakers arranged in the left side surface of the first housing thereof and the corresponding one of the speakers arranged in the right side surface of the second housing thereof.

* * * * *